US009833908B2

(12) United States Patent
Nagatsuka

(10) Patent No.: US 9,833,908 B2
(45) Date of Patent: Dec. 5, 2017

(54) HAND MECHANISM

(71) Applicant: THK CO., LTD., Tokyo (JP)

(72) Inventor: Masaki Nagatsuka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/102,811

(22) PCT Filed: Dec. 8, 2014

(86) PCT No.: PCT/JP2014/082372
§ 371 (c)(1),
(2) Date: Jun. 8, 2016

(87) PCT Pub. No.: WO2015/087819
PCT Pub. Date: Jun. 18, 2015

(65) Prior Publication Data
US 2016/0311117 A1    Oct. 27, 2016

(30) Foreign Application Priority Data

Dec. 9, 2013  (JP) ................................ 2013-254252
Dec. 9, 2013  (JP) ................................ 2013-254253

(51) Int. Cl.
 *B25J 15/10*  (2006.01)
 *B25J 15/06*  (2006.01)
 *B25J 15/00*  (2006.01)

(52) U.S. Cl.
 CPC ....... *B25J 15/0009* (2013.01); *B25J 15/0616* (2013.01); *B25J 15/10* (2013.01); *Y10S 901/40* (2013.01)

(58) Field of Classification Search
 CPC .. B25J 15/0028; B25J 15/0009; B25J 15/022; B25J 15/0616; B25J 15/0052;
 (Continued)

(56) References Cited

U.S. PATENT DOCUMENTS 3,173,151 A    3/1965 Glabiszewski
4,364,593 A   12/1982 Maeda
(Continued)

FOREIGN PATENT DOCUMENTS

CN        1365877 A    8/2002
CN      100999077 A    7/2007
(Continued)

OTHER PUBLICATIONS

Notification of Transmittal of Translation of the International Preliminary Report on Patentability (Form PCT/IB/338) issued in counterpart International Application No. PCT/JP2014/082372 dated Jun. 23, 2016 with Forms PCT/IB/373 and PCT/ISA/237. (6 pages).

(Continued)

*Primary Examiner* — Dean Kramer
(74) *Attorney, Agent, or Firm* — Westerman, Hattori, Daniels & Adrian, LLP

(57) ABSTRACT

A hand mechanism including a first multi-joint finger, a second multi-joint finger, and a single-joint finger rotatable about a center of a predetermined connecting portion together with the first and second multi-joint fingers. The mechanism executes a first mode in which the respective entire fingers of the first and second multi-joint fingers are rotated in an identical direction using a connecting portion with respect to an attachment member when driven by a driving actuator, and a second mode in which a finger section other than a first predetermined finger section included in the first multi-joint finger is rotated with respect to the first predetermined finger section and a finger section other than a second predetermined finger section included in the second multi-joint finger is rotated with respect to the second predetermined finger section, when the rotation of (Continued)

the first and second predetermined finger sections are inhibited in the first mode.

16 Claims, 18 Drawing Sheets

(58) Field of Classification Search
CPC ........ B25J 15/10; B25J 15/103; B25J 15/106; Y10S 901/39; Y10S 901/40
USPC .......................................... 294/106, 2, 185
See application file for complete search history.

(56) References Cited

U.S. PATENT DOCUMENTS

| | | | | |
|---|---|---|---|---|
| 4,984,951 | A | * | 1/1991 | Jameson .............. B25J 15/0009 294/106 |
| 5,762,390 | A | * | 6/1998 | Gosselin ................ B25J 15/103 294/106 |
| 5,863,086 | A | * | 1/1999 | Christenson .............. B65F 3/04 294/106 |
| 6,668,678 | B1 | * | 12/2003 | Baba ........................ B25J 9/104 414/680 |
| 8,549,952 | B2 | * | 10/2013 | Matsukuma ............. B25J 9/104 294/104 |
| 8,597,370 | B2 | * | 12/2013 | Wisse ..................... A61F 2/588 294/213 |
| 2007/0236162 | A1 | | 10/2007 | Kawabuchi et al. |
| 2011/0148132 | A1 | * | 6/2011 | Park ........................ B25J 15/10 294/106 |
| 2013/0183129 | A1 | * | 7/2013 | Nammoto ................ B25J 15/10 414/729 |
| 2014/0197652 | A1 | * | 7/2014 | Wang .................. B25J 15/0616 294/185 |

FOREIGN PATENT DOCUMENTS

| | | |
|---|---|---|
| CN | 101244563 A | 8/2008 |
| CN | 101653941 A | 2/2010 |
| CN | 201734803 U | 2/2011 |
| CN | 102161232 A | 8/2011 |
| CN | 102814818 A | 12/2012 |
| CN | 103128744 A | 6/2013 |
| EP | 2454055 A1 | 5/2012 |
| EP | 2454055 B1 | 12/2013 |
| FR | 2 602 170 A1 | 2/1988 |
| JP | 56-62785 A | 5/1981 |
| JP | 59-140189 U | 9/1984 |
| JP | 61-86192 A | 5/1986 |
| JP | 8-323676 A | 12/1996 |
| JP | 2008-155302 A | 7/2008 |
| JP | 2011-104752 A | 6/2011 |
| JP | 4983245 B2 | 7/2012 |
| JP | 5122134 B2 | 1/2013 |
| JP | 2013-85579 A | 5/2013 |
| JP | 2013-154409 A | 8/2013 |
| WO | 2005/095066 A1 | 10/2005 |
| WO | 2011/005085 A1 | 1/2011 |

OTHER PUBLICATIONS

Office Action dated Dec. 26, 2016. issued in counterpart Chinese Application No. 201480067435.6, with English translation and Search Report (26 pages).
International Search Report dated Mar. 3, 2015, issued in counterpart International Application No. PCT/JP2014/082372 (2 pages).
Yamaguchi et al., "Development of Robot Hand with Suction Mechanism for Robust and Dexterous Grasping", IEEE/RSJ International Conference on Intelligent Robots and Systems (IROS), Nov. 3, 2013, pp. 5500-5505.
Search Report dated Oct. 17, 2017, issued in counterpart European Application No. 14868854.2 (10 pages).

* cited by examiner

[Fig. 1]
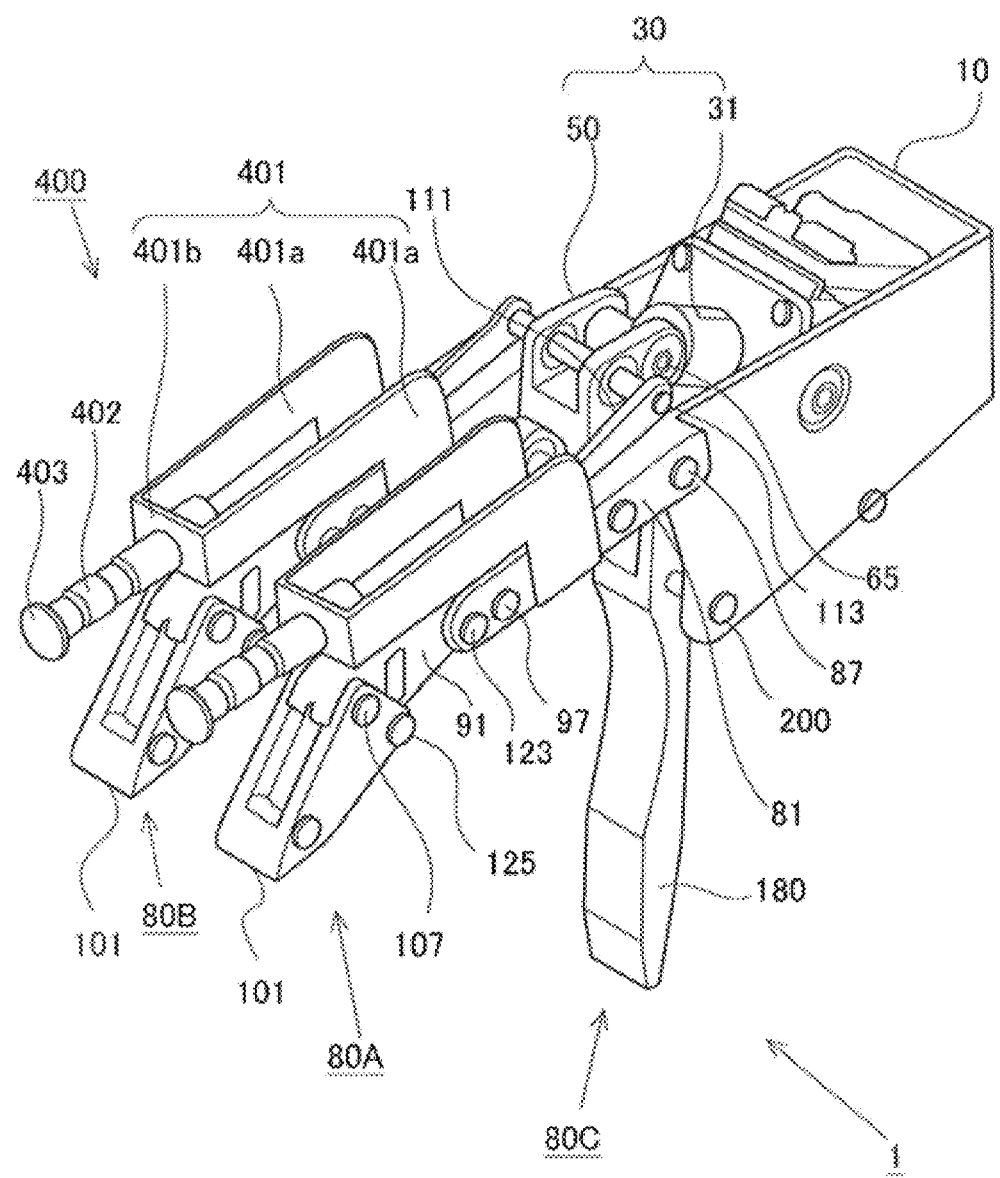

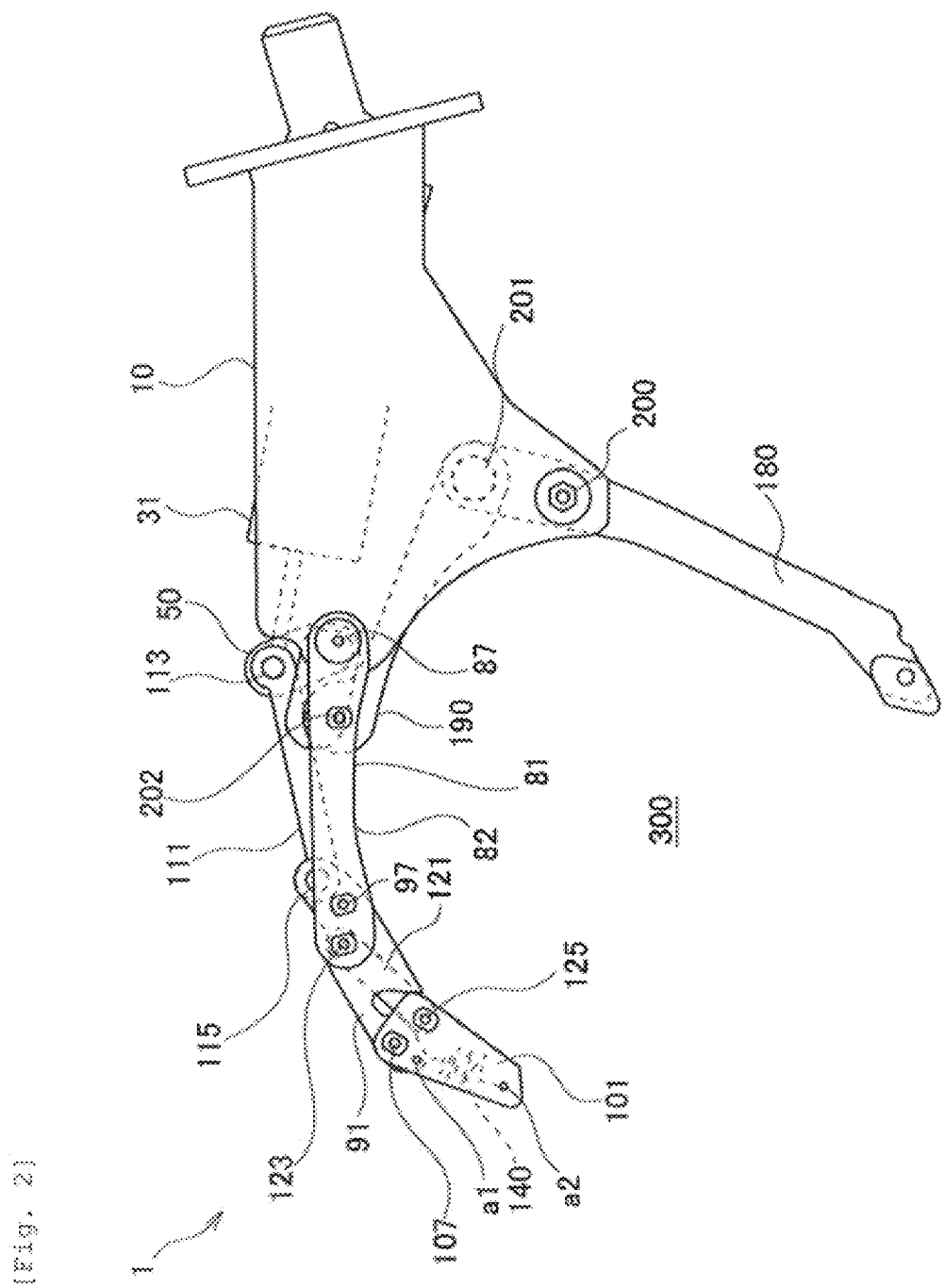
[Fig. 2]

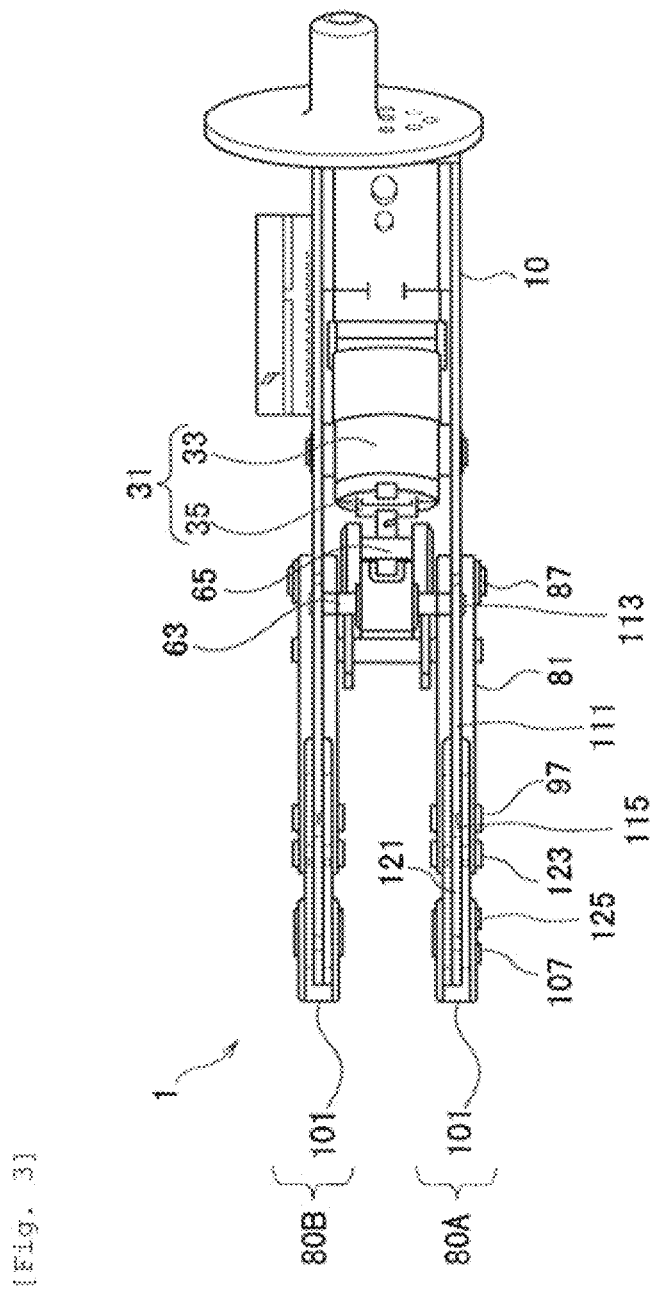
[Fig. 3]

[Fig. 4]
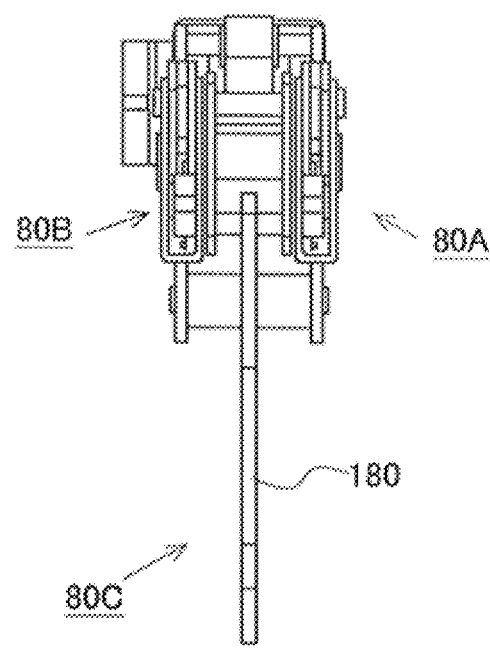

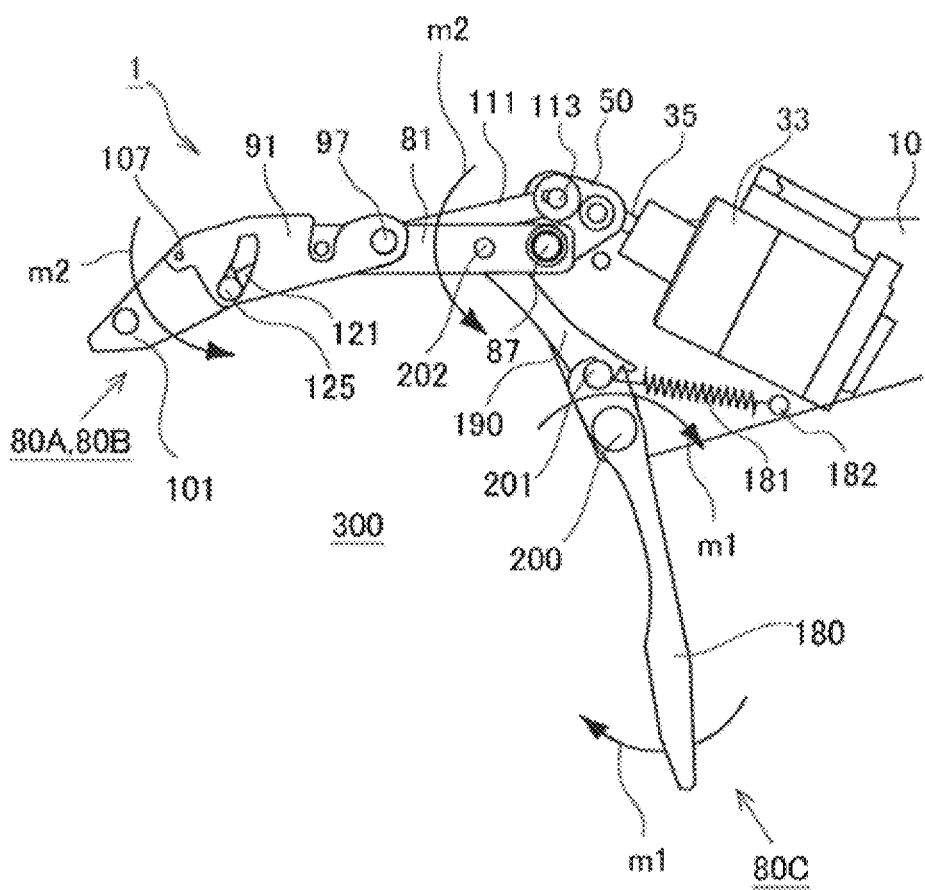

[Fig. 6]
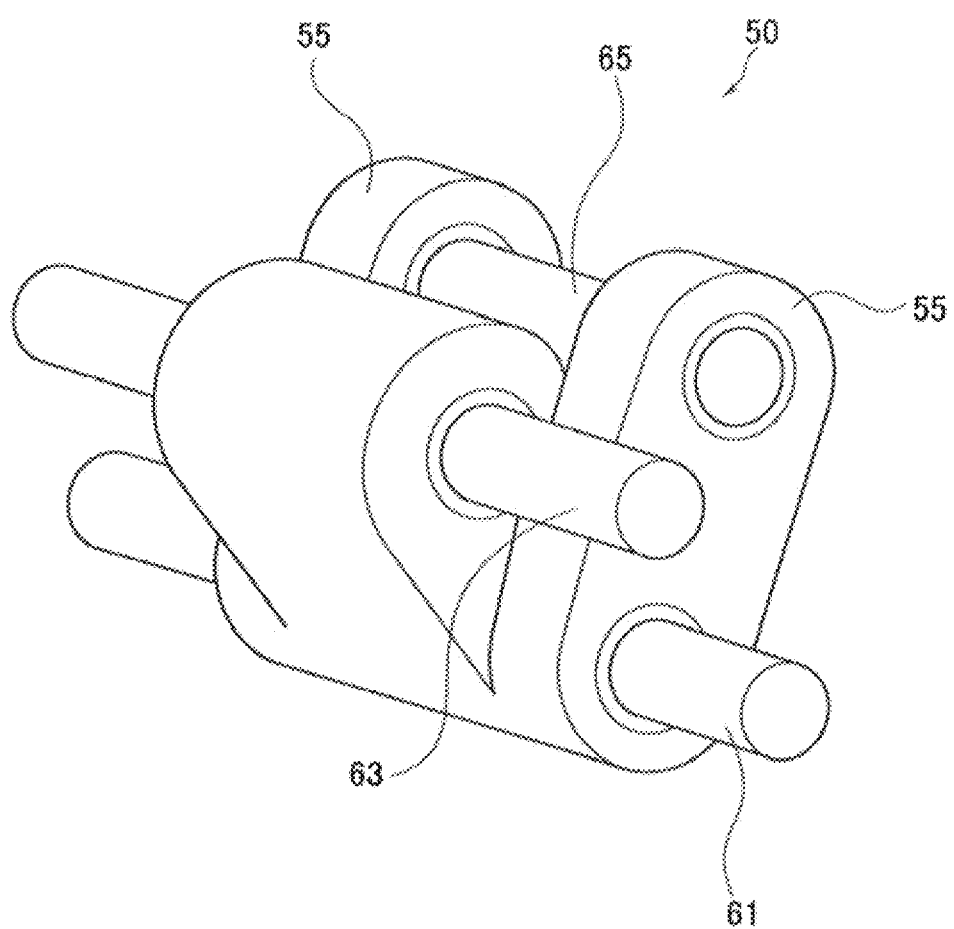

[Fig. 7]
(a)
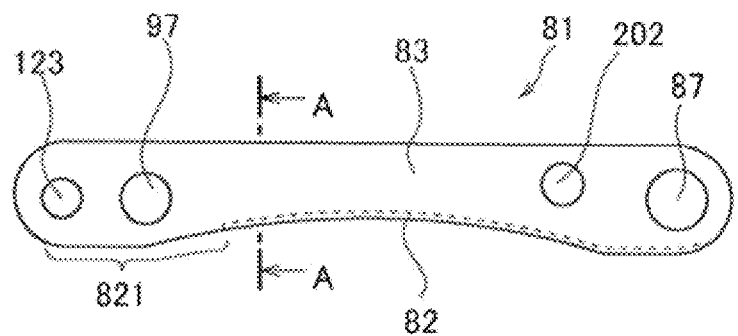
(b)
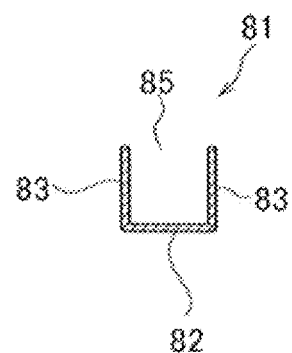

[Fig. 8]
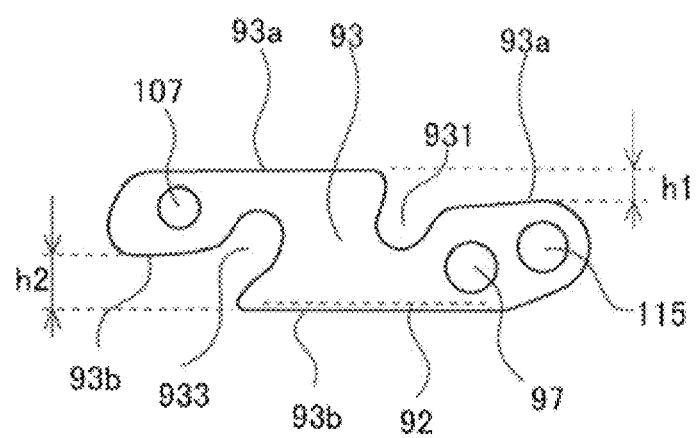

[Fig. 9]
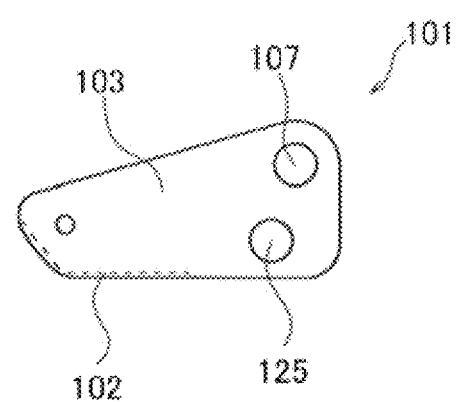

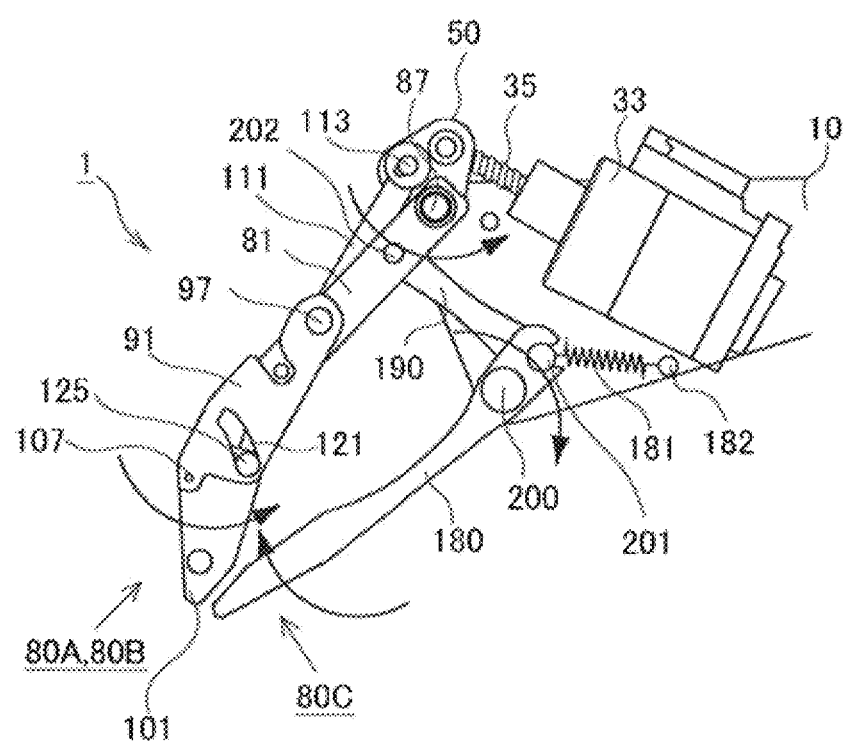
[Fig. 10]

[Fig. 11]
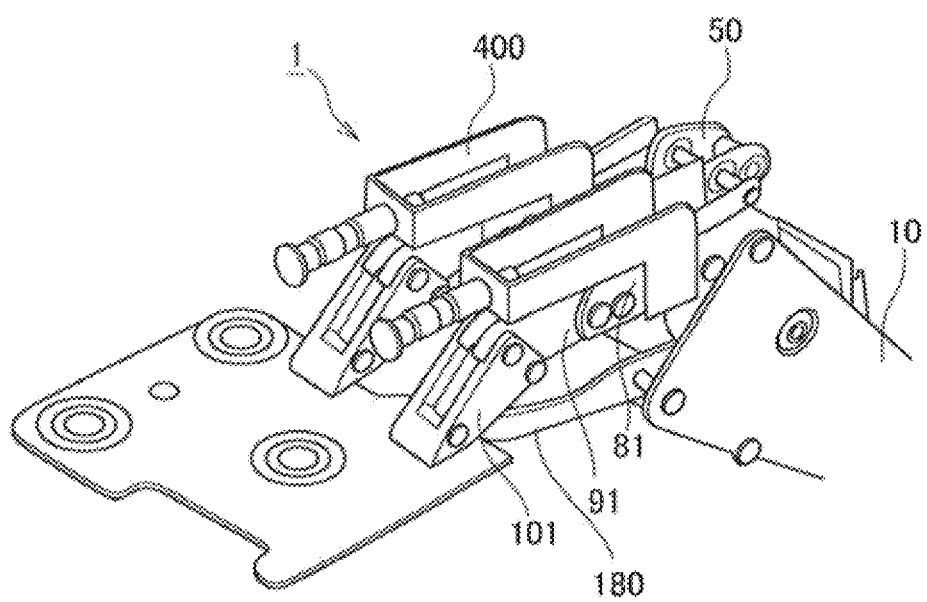

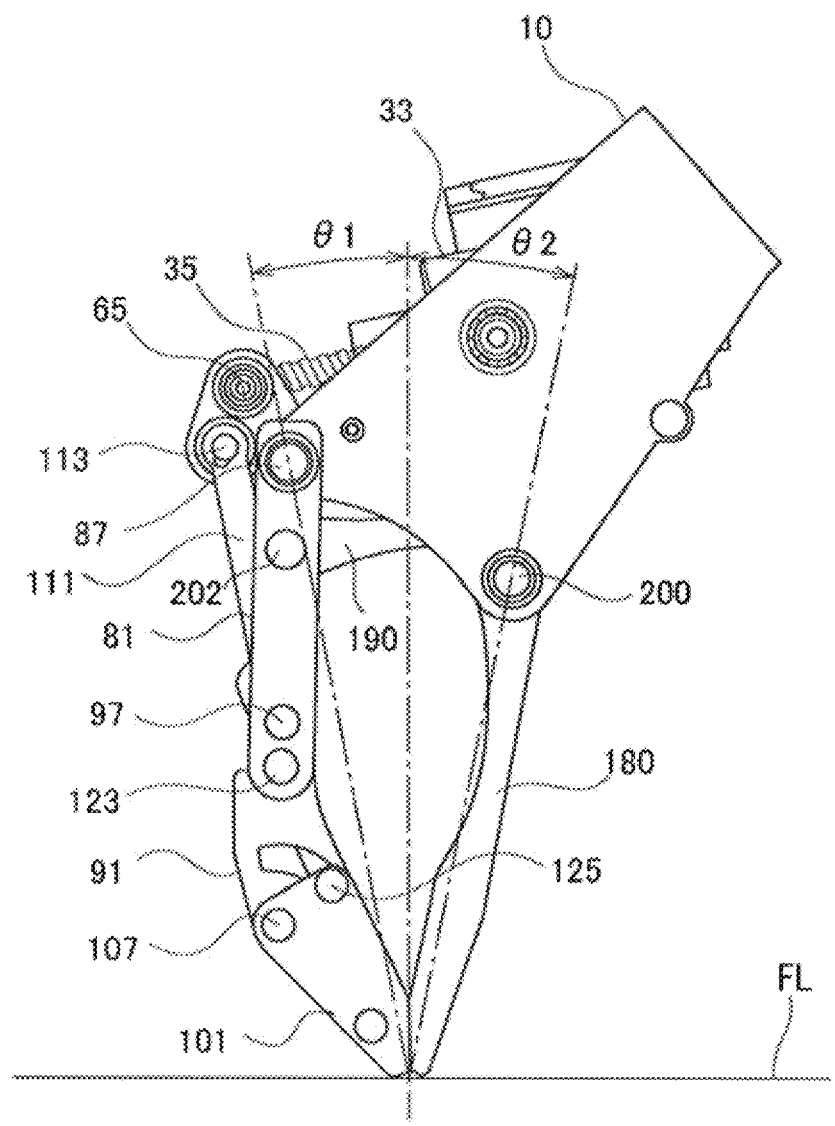
[Fig. 12]

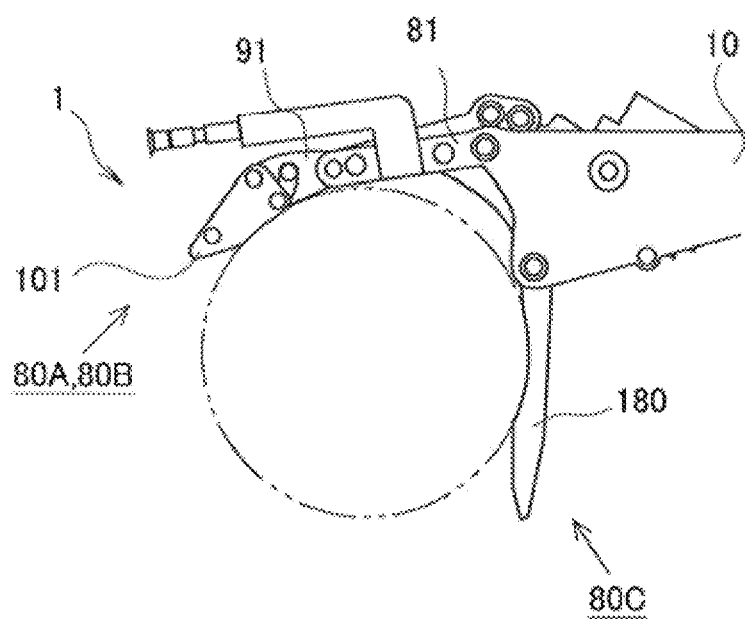
[Fig. 13]

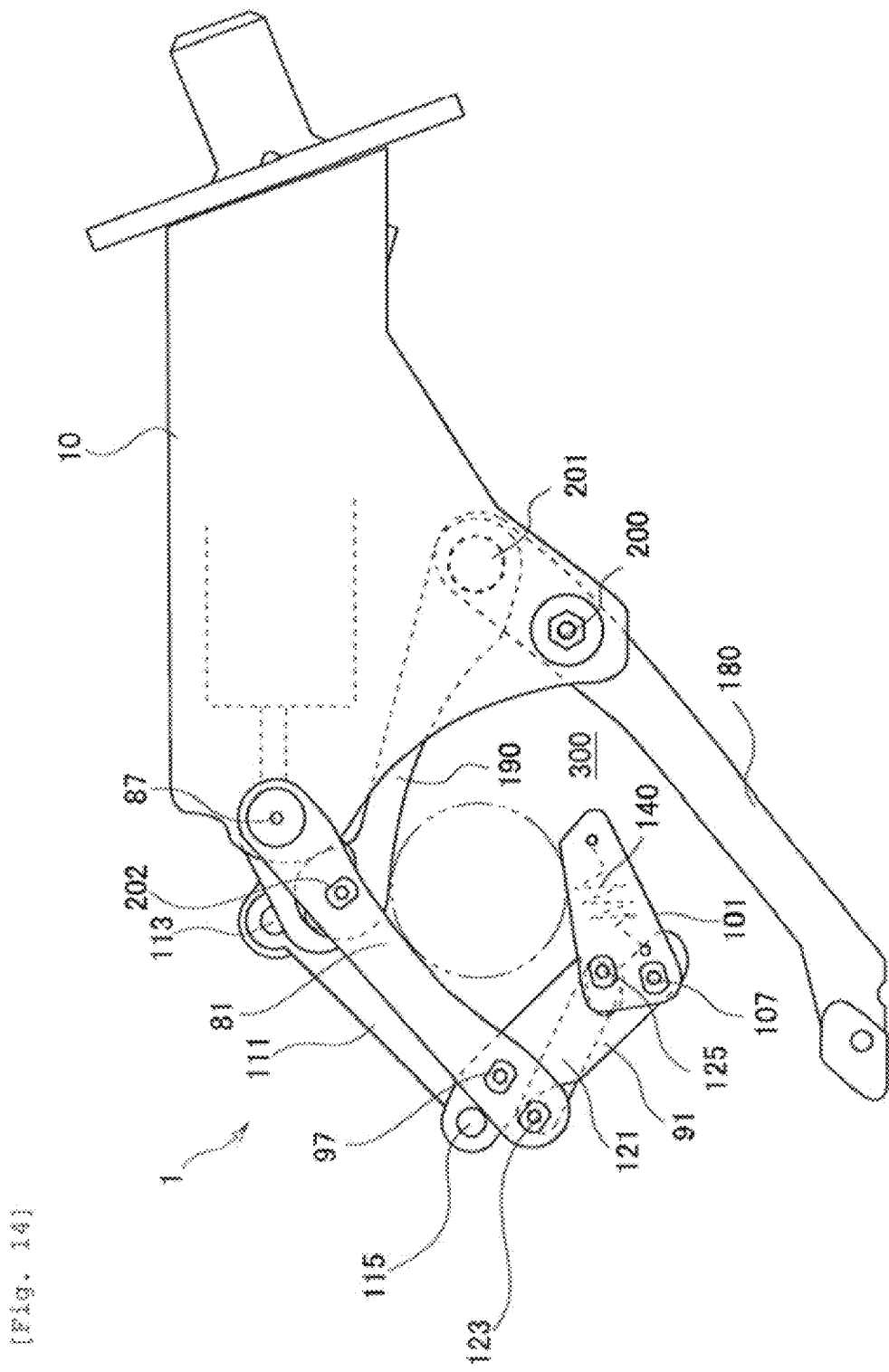
[Fig. 14]

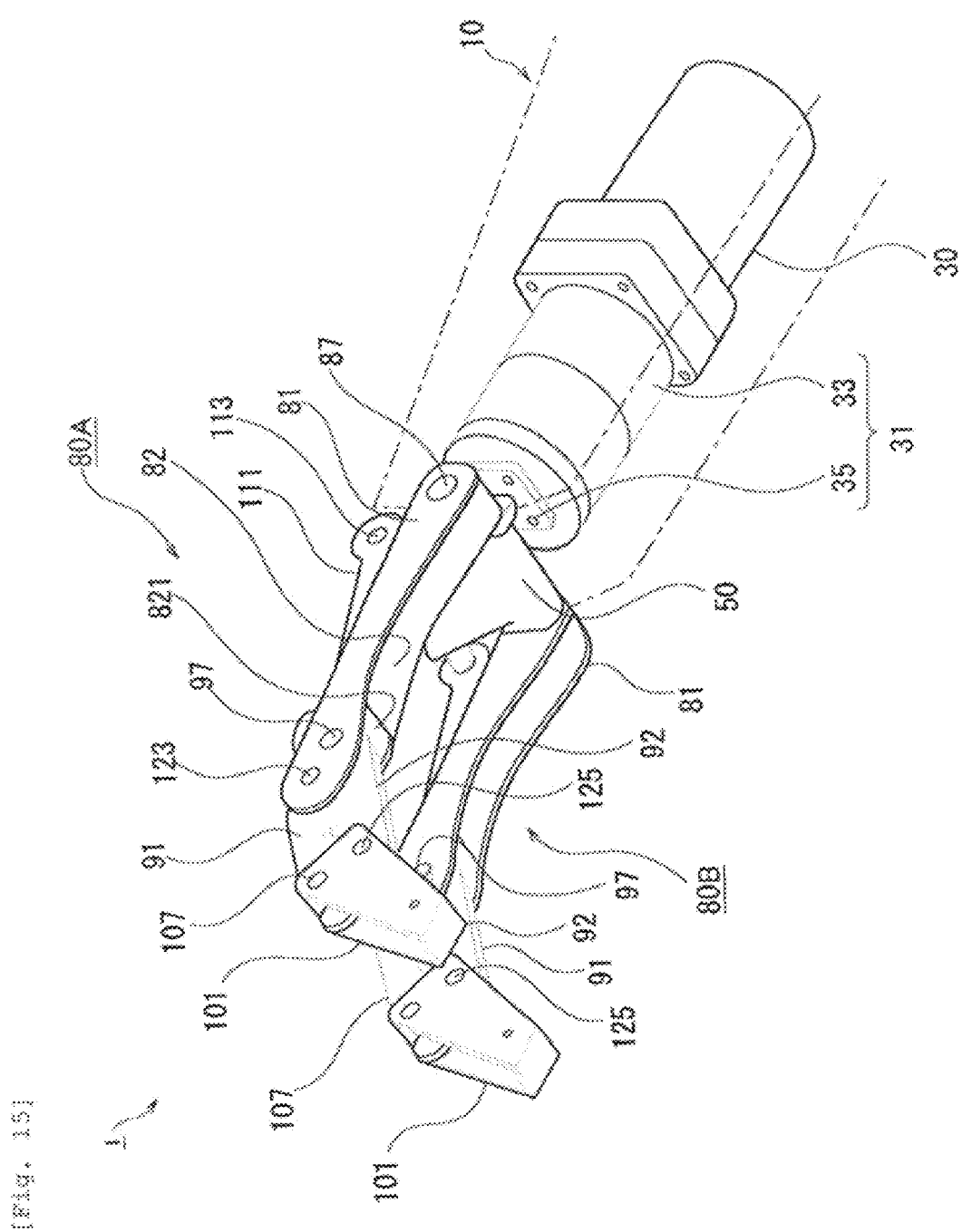

[Fig. 16]
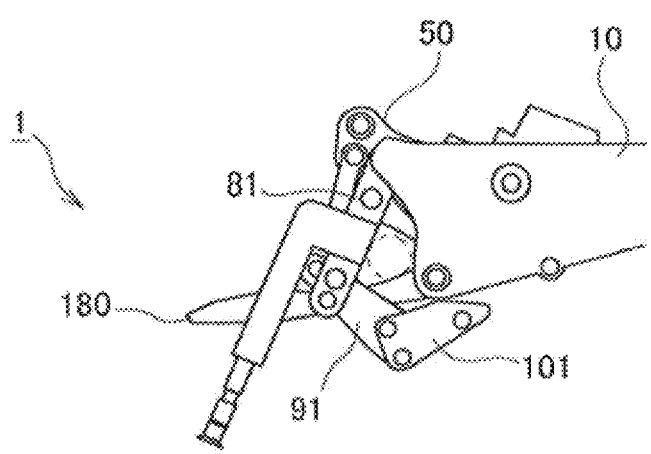

[Fig. 17]
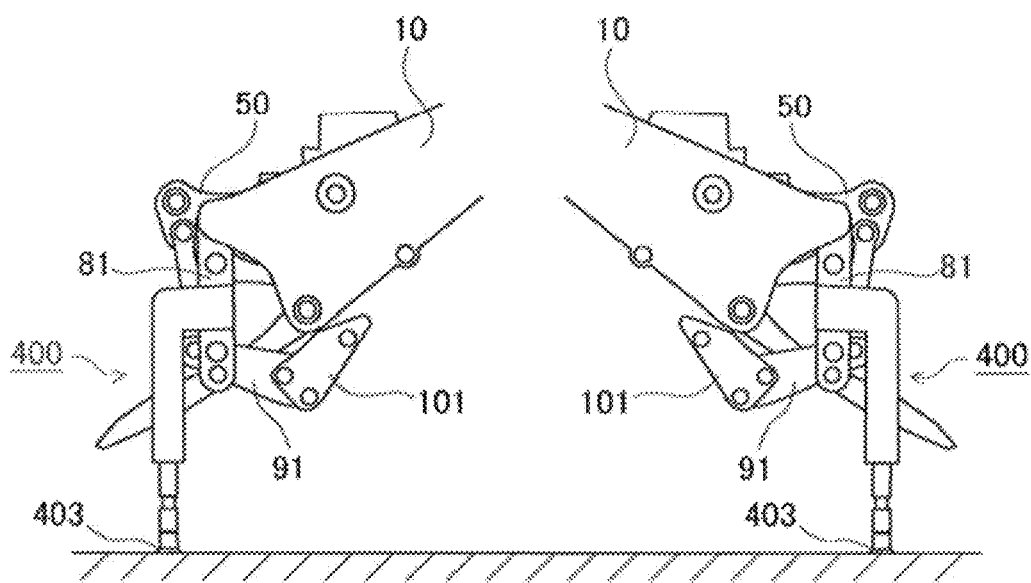

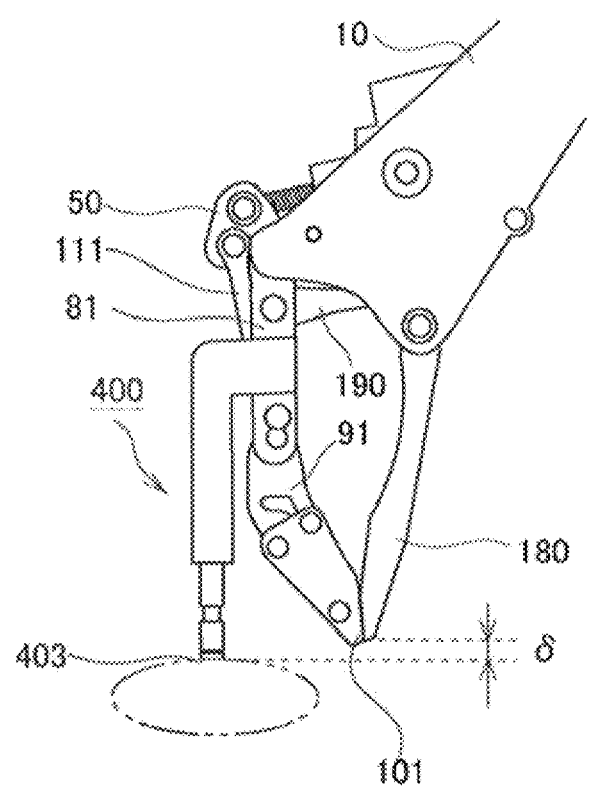
[Fig. 18]

HAND MECHANISM

TECHNICAL FIELD

The present invention relates to a hand mechanism for gripping a gripping object.

BACKGROUND ART

Conventionally, a structure, which is approximate to the structure of human fingers, is adopted for a robot hand, and it is tried to grip a variety of objects. For example, a structure described in Patent Literature 1 is disclosed as a hand structure for stably gripping not only large objects but also small objects. The hand structure is provided with a plurality of finger mechanisms which correspond to a plurality of fingers. Each of the plurality of finger mechanisms is composed of a plurality of phalange sections including a distal phalange section and a middle phalange section which adjoins the distal phalange section. Then, the distal phalange section is made rotatable within a predetermined angle range in two directions of the inner direction and the outer direction as starting from a state in which the distal phalange section is stretched in a straight form with respect to the middle phalange section. Thus, an action is realized, which is approximate to the "pinching" action performed by human fingers.

On the other hand, another hand structure, which is described in Patent Literature 2, is accompanied by a link mechanism, and a finger is formed by a plurality of members. Further, in the case of this hand structure, when the rotation of the member disposed at the root of the finger is inhibited on account of the contact with an object, then another member is rotated with respect to the member disposed at the root, and thus an action is realized by the entire finger to enfold or roll up the object so that the gripping of the object is performed.

Further, Patent Literature 3 discloses such a construction that a base section is composed of a plurality of structural members, and the plurality of structural members are rotatably connected to one another by the aid of support portions, wherein the attraction is effected by a magnet to cause fixation, and an elastic member urges in a direction in which the structural members are separated from each other. In the case of this construction, if any external force is applied when the robot hand grips a gripping object, then the finger is separated from the structure of the hand at the root portion of the finger, by adjusting the relationship between the attractive force of the magnet and the urging force of the elastic member. Accordingly, it is possible to avoid such a situation that the finger and/or the gripping object is/are damaged by the applied external force.

PRIOR ART LITERATURES

Patent Literatures

Patent Literature 1: Japanese Patent No. 5122134
Patent Literature 2: Japanese Patent Application Laid-Open No. 2013-154409
Patent Literature 3: Japanese Patent Application Laid-Open No. 2008-155302

SUMMARY OF THE INVENTION

Problems to be Solved by the Invention

In the case of the conventional hand mechanism, it is possible to perform a variety of gripping actions with respect to the gripping object, but the structure of the hand mechanism is extremely complicated. It is feared that any difficulty may arise in relation to the production and/or any difficulty in controllability may arise in relation to the use. That is, in order to realize various gripping actions, it is necessary that a plurality of driving actuators should be carried, and the respective actuators should be appropriately driven to perform the desired action, which cannot be necessarily affirmed to be practical. Further, for example, the high durability or tolerance and the high maintainability are requested for the hand mechanism of the robot to be used in the field of FA for factories or the like. However, the more complicated the structure of the hand mechanism is, the more difficult to respond to such a request is.

Coincidentally, the image recognition technique is progressively developed in recent years. It is strongly requested to allow the robot to perform the gripping action for gripping a variety of objects in the field of FA by utilizing the recognition result. Conventionally, a plurality of exclusively usable end effectors, which are specialized for specified gripping actions, are prepared and selected depending on the purpose of the work in some cases as well. However, in the case of such a procedure, the maintainability and the convenience are not preferred. It is more strongly expected after all to obtain a hand mechanism which makes it possible to perform a variety of gripping actions.

The present invention has been made taking the foregoing problems into consideration, an object of which is to provide a hand mechanism which makes it possible to realize a variety of gripping actions and which also makes it possible to realize preferred durability or tolerance and maintainability by simplifying the structure.

Means for Solving the Problems

In order to solve the problems described above, the present invention adopts a construction of a hand mechanism having two multi-joint fingers and one single-joint finger. Then, different modes relevant to the gripping action are realized in the hand mechanism by means of the driving force transmitted from one driving actuator. Thus, it is intended to fulfill both of the request for a variety of gripping actions and the simple structure.

In particular, the present invention resides in a hand mechanism comprising an attachment member; a first multi-joint finger and a second multi-joint finger each of which is a multi-joint finger including a plurality of finger sections connected so that the finger sections are mutually rotatable by the aid of connecting portions, one finger section of the plurality of finger sections being rotatably attached to the attachment member on a root side thereof; a driving section which transmits a driving force from a driving actuator to the first multi-joint finger and the second multi-joint finger; and a single-joint finger formed by one finger section which is connected to the first multi-joint finger and the second multi-joint finger and which is connected to be rotatable about a center of a predetermined connecting portion with respect to the attachment member, the single-joint finger being rotatable about the center of the predetermined connecting portion together with the first multi-joint finger and the second multi-joint finger by the driving force transmitted from the driving actuator. Then, the hand mechanism is capable of executing a first mode in which the respective entire fingers of the first multi-joint finger and the second multi-joint finger are rotated in an identical direction by the aid of the connecting portions for making connection with the attachment member when the driving force is applied via the driving section from the driving actuator; and a second mode in which the finger section other than a first predetermined finger section included in the first multi-joint finger is rotated with respect to the first predetermined finger section and the finger section other than a second predetermined finger section included in the second multi-joint finger is rotated with respect to the second predetermined finger section, when the first predetermined finger section included in the first multi-joint finger and the second predetermined finger section included in the second multi-joint finger are inhibited from being rotated in the first mode. Then, the single-joint finger is rotated in the first mode in a direction opposite to a rotation direction of the first multi-joint finger and the second multi-joint finger, both of a distance between a forward end portion of the first multi-joint finger and a forward end portion of the single-joint finger and a distance between a forward end portion of the second multi-joint finger and the forward end portion of the single-joint finger being narrowed in the direction; and the rotation of the single-joint finger about the center of the predetermined connecting portion is stopped in the second mode simultaneously with stop of the rotation of the first predetermined finger section and the second predetermined finger section.

The hand mechanism according to the present invention has the first multi-joint finger, the second multi-joint finger, and the single-joint finger, and at least the two gripping actions in the first mode and the second mode are performed. The three fingers have the extremely simple structures, because the two gripping actions in the first mode and the second mode are realized by transmitting the driving force from the driving actuator via the driving section. In this case, the reason, why the first multi-joint finger and the second multi-joint finger are formed by the plurality of finger sections, is that it is intended to enable the gripping actions to be performed in the first and second modes for which details will be described later on, especially it is intended to rotate the other finger sections with respect to the first predetermined finger section and the second predetermined finger section in the second mode. On the other hand, the reason, why the single-joint finger is formed by the one finger section, is that it is intended to simplify the construction of the hand mechanism as far as possible, and it is intended to easily realize the gripping action for the gripping object in the first mode.

In this case, in the first mode, the entire fingers of the first multi-joint finger and the second multi-joint finger are rotated in the identical direction about the center of the connecting portion for making connection with the attachment member, and the single-joint finger is rotated in the direction opposite to the rotation direction of the first multi-joint finger and the second multi-joint finger about the center of the predetermined connecting portion for making connection with attachment member in the same manner as described above. Therefore, in the first mode, the space, which is formed between the first multi-joint finger and the second multi-joint finger and the single-joint finger, is narrowed. Accordingly, it is possible to grip the gripping object between the first multi-joint finger and the second multi-joint finger and the single-joint finger. In particular, in a sense, the pinching action, in which the gripping object is mutually pinched by the forward end portions, can be performed by shortening the distance between the forward end portion of the first multi-joint finger and the forward end portion of the single-joint finger and shortening the distance between the forward end portion of the second multi-joint finger and the forward end portion of the single-joint finger.

The pinching action is especially useful when the gripping object is small and when the gripping action is thin. Further, in the first mode, the entire fingers of the first multi-joint finger and the second multi-joint finger, which have the plurality of finger sections, are rotated. Therefore, it is especially easy to specify the positions of the forward end portions of the both multi-joint fingers. The single-joint finger has only the one finger section, and hence it is easy to specify the position of the forward end portion of the finger in the same manner as described above. Therefore, in the first mode, it is also possible to precisely and easily grip the gripping object which is relatively small or thin, by means of the both forward end portions of the first multi-joint finger and the second multi-joint finger and the forward end portion of the single-joint finger. Also from this viewpoint, it is possible to understand that the hand mechanism according to the present invention is highly practical.

Then, in the next place, the second mode is the mode of the gripping action performed subsequently to the first mode. When the first predetermined finger section of the first multi-joint finger and the second predetermined finger section of the second multi-joint finger are inhibited from being rotated in the first mode, then the finger section other than the first predetermined finger section included in the first multi-joint finger is rotated with respect to the first predetermined finger section, and the finger section other than the second predetermined finger section included in the second multi-joint finger is rotated with respect to the second predetermined finger section. In this situation, as for the single-joint finger, the rotation in the first mode is stopped simultaneously with the stop of the rotation of the first predetermined finger section and the second predetermined finger section. Owing to the construction as described above, the first multi-joint finger and the second multi-joint finger perform the enfolding action. It is possible to grip the gripping object in accordance with the enfolding action. In particular, when the first predetermined finger section and the second predetermined finger section are inhibited from being rotated by the gripping object positioned in the space between the first multi-joint finger and the second multi-joint finger and the single-joint finger, the finger sections of the first multi-joint finger and the second multi-joint finger other than the first predetermined finger section and the second predetermined finger section are progressively rotated so that the gripping object enfolded or rolled up. Therefore, the enfolding gripping action for enfolding and gripping the gripping object is realized more effectively.

As for the hand mechanism constructed as described above, one finger is formed by a plurality of finger sections as is the case of the first multi-joint finger and the second multi-joint finger, and the other is formed by one finger section as is the case of the single-joint finger. Accordingly, it is intended that the realization of the plurality of gripping actions and the simple structure are compatible with each other. Further, the gripping actions in the first mode and the second mode are realized by applying the driving force from one driving actuator. Therefore, it is possible to further simplify the structure of the hand mechanism. Further, the control of the driving actuator required for the gripping action is the convenient control as well. Further, the first multi-joint finger, the second multi-joint finger, and the single-joint finger act on the gripping object. The gripping object is gripped at three points either in the first mode or in the second mode. Therefore, it is possible to realize the stable gripping.

On the other hand, in the case of the conventional hand mechanism, the driving force is generally applied, for example, from a predetermined actuator, and fingers provided for the hand mechanism are driven and rotated, for example, so that the object is gripped. In this context, if it is intended to reliably grip the gripping object and finely control the fingers of the hand mechanism, it is appropriate to increase the number of actuators and/or increase the output thereof. However, in such a case, the construction of the hand mechanism becomes complicated, and/or the energy required to drive the hand mechanism is increased. On the other hand, if the number of actuators is small, and/or the output thereof is small, then it is inevitable to lower the weight capacity (load capacity) provided by the hand mechanism, because the driving force applied from the actuator is limited. Further, in general, when it is intended to grip the object by means of the hand mechanism, it is necessary that the gripping force should be continuously applied against the gravity acting on the object. Therefore, it is not easy to lower the rated power output of the actuator, provided that the situation depends on the function to be exhibited by the hand mechanism. As described above, it is not easy for the hand mechanism that the function to be exhibited and the simplification of the construction are compatible with each other. On the other hand, any hand mechanism, which makes it possible to perform a variety of gripping actions, is more strongly expected. In this situation, it is inevitable to complicate the hand mechanism and increase the output of the actuator.

In view of the above, the hand mechanism described above may further comprise urging means which applies an urging force to the single-joint finger distinctly from the driving force applied from the driving actuator, the urging force being applied to rotate the single-joint finger toward the first multi-joint finger and the second multi-joint finger about a center of the predetermined connecting portion. The three fingers (first multi-joint finger, second multi-joint finger, and single-joint finger) of the hand mechanism according to the present invention realize the gripping actions by transmitting the driving force from the driving actuator via the driving section. Therefore, the relatively high function is exhibited by the structure which is simple as the hand mechanism. In this case, the reason, why the first multi-joint finger and the second multi-joint finger are formed by the plurality of finger sections, is that a variety of gripping actions are enabled by folding and stretching the shape of the entire finger, for example, in accordance with the rotation of each of the finger sections. On the other hand, the resonant, why the single-joint finger is formed by one finger section, is that it is intended to simplify the construction of the hand mechanism as far as possible, and it is intended to easily realize the gripping of the gripping object. In this way, the hand mechanism according to the present invention is formed by the two types of the fingers in which the construction of the finger is clearly different.

In the hand mechanism having the fingers as described above, the urging means, which applies the urging force distinguished from the driving force applied from the driving actuator, is provided on the side of the single-joint finger. As described above, the single-joint finger is formed by one finger section, and the single-joint finger is rotatably attached to the attachment member. Therefore, the urging force, which is applied by the urging means, generates the univocal or definite moment of rotation in relation to the rotational driving of the single-joint finger, and the gripping action performed by the hand mechanism is not complicated thereby. Further, when it is intended to grip the gripping object by using the first multi-joint finger and the second multi-joint finger having the plurality of finger sections and the single-joint finger, the moment, which makes it possible to maintain at least the state in which the gripping object is gripped, is generated about the center of the predetermined connecting portion of the single-joint finger, by applying the urging force described above to the side of the single-joint finger. This effectively helps the output of the driving actuator in view of the gripping function to grip the gripping object. Therefore, it is considered that this contributes to the miniaturization of the driving actuator to provide the output and the simplification of the construction of the hand mechanism.

Effect of the Invention

It is possible to provide the hand mechanism which makes it possible to realize a variety of gripping actions and which also makes it possible to realize preferred durability or tolerance and maintainability by simplifying the structure.

BRIEF DESCRIPTION OF THE DRAWINGS

FIG. 1 shows a perspective view illustrating a hand mechanism according to first and second embodiments of the present invention.

FIG. 2 shows a side view illustrating the hand mechanism shown in FIG. 1.

FIG. 3 shows a top view illustrating the hand mechanism shown in FIG. 1.

FIG. 4 shows a front view illustrating the hand mechanism shown in FIG. 1.

FIG. 5 shows a schematic construction of a link mechanism included in the hand mechanism shown in FIG. 1.

FIG. 6 shows a construction of a joining member for constructing the hand mechanism shown in FIG. 1.

FIG. 7 shows a construction of a first finger section for constructing the hand mechanism shown in FIG. 1.

FIG. 8 shows a construction of a second finger section for constructing the hand mechanism shown in FIG. 1.

FIG. 9 shows a construction of a third finger section for constructing the hand mechanism shown in FIG. 1.

FIG. 10 shows a state in which the first mode is executed, and multi-joint fingers and a single-joint finger are driven to perform the pinching action by the hand mechanism shown in FIG. 1.

FIG. 11 shows a first drawing illustrating a state in which the hand mechanism shown in FIG. 1 grips a gripping object in accordance with the pinching action.

FIG. 12 shows a positional relationship between the contact position of the multi-joint finger and the single-joint finger and the connecting portions disposed at roots of the respective fingers when the first mode is executed and the multi-joint fingers and the single-joint finger are driven to perform the pinching action by the hand mechanism shown in FIG. 1.

FIG. 13 shows a second drawing illustrating a state in which the hand mechanism shown in FIG. 1 grips a gripping object in accordance with the pinching action.

FIG. 14 shows a first drawing illustrating a state in which the second mode is executed by the hand mechanism shown in FIG. 1 and a gripping object is griped in accordance with the enfolding action of the multi-joint fingers.

FIG. 15 shows an enfolding state of the multi-joint fingers during the execution of the enfolding action in accordance with the second mode by the hand mechanism shown in FIG. 1.

FIG. 16 shows a second drawing illustrating a state in which the second mode is executed by the hand mechanism shown in FIG. 1 and a gripping object is griped in accordance with the enfolding action of the multi-joint fingers.

FIG. 17 shows first drawings illustrating a state in which a suction object is sucked by a suction mechanism of the hand mechanism according to the second embodiment of the present invention.

FIG. 18 shows a second drawing illustrating a state in which a suction object is sucked by the suction mechanism of the hand mechanism according to the second embodiment of the present invention.

MODES FOR CARRYING OUT THE INVENTION

An explanation will be made below on the basis of the drawings about specified embodiments of the present invention. For example, the dimension or size, the material, the shape, and the relative arrangement of each of constitutive parts or components described in the embodiment of the present invention are not intended to limit the scope of the invention only thereto unless specifically noted.

First Embodiment

Construction of Hand Mechanism 1

FIG. 1 shows a perspective view illustrating a hand mechanism 1 according to an embodiment of the present invention. FIG. 2 shows a side view illustrating the hand mechanism 1, FIG. 3 shows a top view illustrating the hand mechanism 1, and FIG. 4 shows a front view illustrating the hand mechanism 1. In FIG. 5, the inside of the hand mechanism 1 is visualized so that the state of a link mechanism including multi-joint fingers 80A, 80B and a single-joint finger 80C for forming the hand mechanism 1 can be grasped. Note that FIG. 1 also discloses a construction of a hand mechanism 1 according to a second embodiment described later on. As shown in the drawings, the hand mechanism 1 is constructed to include an attachment member 10, a driving mechanism 30 which is attached to the attachment member 10, and the pair of multi-joint fingers 80A, 80B and the single-joint finger 80C which are attached to the attachment member 10 and which are driven by the driving mechanism 30. The pair of multi-joint fingers 80A, 80B reside in the multi-joint finger in which a plurality of finger sections are connected by a plurality of connecting portions so that the finger sections are mutually rotatable and the finger section disposed at the root is attached to the attachment member 10. Further, the single-joint finger 80C resides in the single-joint finger which is formed by one finger section and which is connected to the attachment member 10 by the aid of a connecting portion at the root of the finger section. Detailed structures of the respective fingers will be described later on. Note that in the following explanation, the direction, in which the fingers 80A, 80B, 80C are progressively bent (direction in which the space between the multi-joint fingers 80A, 80B and the single-joint finger 80C is narrowed as viewed in FIG. 2), is referred to as "inner side" or "palm side of the hand", and the direction, which is opposite thereto (direction in which the space is widened as viewed in FIG. 2), is referred to as "outer side" or "back side of the hand".

In FIG. 1, the attachment member 10 is depicted while a part thereof is omitted so that the inside thereof is visualized. The attachment member 10 provides the place to attach a linear actuator 31 of the driving mechanism 30, and the attachment member 10 rotatably supports a joining member 50 and a first finger section 81 independently respectively at the position of a first connecting portion 87. The driving mechanism 30 is constructed to include the linear actuator 31 and the joining member 50. The linear actuator 31 has a main actuator body 33 which forms an almost cylindrical shape and a rod 35 which protrudes movably back and forth from one end surface of the main actuator body 33. The linear actuator 31 is electrically powered. It is possible to regulate the amount of back and forth movement of the rod 35 in accordance with a command fed from a control unit arranged in the attachment member 10.

FIG. 6 shows a perspective view illustrating the joining member 50. As shown in FIG. 6, the joining member 50 has a block-shaped form which is almost V-shaped as viewed from a side plane. A shaft 61 for the first connecting portion is rotatably inserted into a lower central portion of the joining member 50. Further, a shaft 63 for the third connecting portion is rotatably inserted into one upper portion of the joining member 50 as divided into two parts. Furthermore, a joining rod 65, which rotatably joins a pair of side wall portions 55, is attached to the other upper portion of the joining member 50.

As for the joining member 50, the both side portions of the shaft 61 for the first connecting portion are attached to the attachment member 10. Further, first connecting portions 87 of the first finger sections 81 described later on are rotatably attached respectively to the both ends of the shaft 61 for the first connecting portion which penetrates through the attachment member 10 and which protrudes to the both outer sides thereof. In other words, the joining member 50 and the first finger sections 81 are attached to the attachment member 10 so that they are rotatable independently respectively. Note that the single-joint finger 80C is joined to the first finger sections 81 by the aid of joining sections 190 as described later on. On the other hand, the forward end of the rod 35 of the linear actuator 31 is attached to a central portion of the joining rod 65 of the joining member 50. Further, third connecting portions 113 of first driving sections 111 described later on are attached to the both ends of the shaft 63 for the third connecting portion of the joining member 50. In this way, one linear actuator 31 of the hand mechanism 1 is joined to the two multi-joint fingers 80A, 80B and the single-joint finger 80C by the aid of the joining member 50.

Next, the structure of the multi-joint fingers 80A, 80B will be explained in detail. Note that the multi-joint fingers 80A, 80B have the same structure. Therefore, the multi-joint finger 80A will be explained as the representative in this specification. The multi-joint finger 80A has the first finger section 81 which is rotatably connected to the attachment member 10 at the first connecting portion 87 disposed on the root side (side of the attachment member 10), a second finger section 91 which is rotatably connected on the root side at a second connecting portion 97 disposed on the forward end side of the first finger section 81 (side separated from the attachment member 10), and a third finger section 101 which is rotatably connected on the root side at a fifth connecting portion 107 disposed on the forward end side of the second finger section 91. Further, the multi-joint finger 80A is joined with the first driving section 111 which has the forward end side rotatably connected at a fourth connecting portion 115 disposed on the root side of the second finger section 91 and the root side connected to the third connecting portion 113 for applying the driving motive power, and a second driving section 121 which has the forward end side rotatably connected to a seventh connecting portion 125 disposed on the root side of the third finger section and the root side rotatably connected to a sixth connecting portion 123 disposed on the forward end side of the first finger section 81. The driving sections 111, 121 are constructed in order to transmit the driving force from the driving mechanism 30 to the respective finger sections of the multi-joint finger 80A as described later on.

In this context, FIG. 7 shows the first finger section 81. FIG. 7(a) shows a side view illustrating the first finger section 81, and FIG. 7(b) shows a sectional view taken along A-A shown in FIG. 7(a). As shown in FIGS. 1, 3, and 7, the first finger section 81 is constructed by providing a pair of side surface portions 83 so that they are parallel to one another on the both sides of a central bottom surface portion 82 by bending one sheet of flat plate (plate member) along lower sides into a substantially U-shaped form. The first connecting portions 87 are provided at the root side portions of the pair of side surface portions 83 as described above. The first finger section 81 is rotatably connected to the attachment member 10 at the portions, wherein the first finger section 81 is arranged so that the central bottom surface portion 82 is directed inwardly (to the palm side of the hand), in other words, an opening portion 85 is directed outwardly (to the back side of the hand). A bearing is installed to the first connecting portion 87 (it is assumed that the rotatable support based on the bearing is also performed for the respective connecting portions described below in the same manner as described above). The second connecting portion 97 is provided on the forward end side of the first finger section 81. Further, the sixth connecting portion 123 is provided at the portion allowed to protrude toward the forward end side as compared with the second connecting portion 97. A second finger section insertion portion 821 is formed by cutting out the bottom surface portion 82 at the lower portion of the first finger section 81 disposed on the forward end side from the vicinity of the second connecting portion 97. Further, as shown in FIG. 7(a), a tenth connecting portion 202 is provided near to the first connecting portion 87 between the first connecting portion 87 and the second connecting portion 97. The tenth connecting portion 202 is the connecting portion to rotatably support the first finger section 81 and a link member 190 so that the both are mutually rotatable as described later on.

In the next place, FIG. 8 shows a side view illustrating the second finger section 91. The second finger section 91 is also constructed by providing a pair of side surface portions 93 so that they are parallel to one another on the both sides of a central bottom surface portion 92 by bending one sheet of flat plate (plate member) along lower sides into a substantially U-shaped form in the same manner as the first finger section 81. The second connecting portions 97 are provided at the root side portions of the pair of side surface portions 93, which is rotatably connected to the pair of side surface portions 83 of the first finger section 81 at the portions. In the case of the second connecting portion 97, the shaft bridges the both side surface portions 83, 93. Portions, which protrude to the root side as compared with the second connecting portion 97, are provided for the both side surface portions 93 of the second finger section 91. The fourth connecting portion 115, which is rotatably connected to the first driving section 111, is provided at the portions. Further, sixth connecting portion insertion recesses 931 each having a substantially U-shaped form, into which the sixth connecting portion 123 is inserted, are formed at positions of sides 93a disposed on the back side of the hand of the both left and right side surface portions 93 of the second finger section 91 on the forward end side as compared with the second connecting portion 97. Portions of the sides 93a disposed on the back side of the hand, which are provided on the root side as compared with the sixth connecting portion insertion recess 931, have heights lower than those of portions disposed on the forward end side (see the height h1 shown in FIG. 8).

Further, seventh connecting portion insertion recesses 933 each having a substantially U-shaped form, into which the seventh connecting portion 125 is inserted, are formed at positions of sides 93b disposed on the inner side (palm side of the hand) of the both left and right side surface portions 93 of the second finger section 91 on the root side as compared with the fifth connecting portion 107. Portions of the sides 93b disposed on the inner side, which are provided on the forward end side as compared with the seventh connecting portion insertion recess 933, have heights higher than those of portions disposed on the root side (see the height h2 shown in FIG. 8). The widthwise dimension between the outer surfaces of the both side surface portions 93 of the second finger section 91 is formed to have the dimension which is slightly smaller than the widthwise dimension between the inner surfaces of the both side surface portions 83 of the first finger section 81. Accordingly, when the second finger section 91 and the first finger section 81 are connected to one another at the second connecting portion 97, the root side portion of the second finger section 91 is inserted between the both left and right side surface portions 83 of the forward end side portions of the first finger section 81. In this situation, the sixth connecting portion insertion recess 931 is arranged between the both side surface portions 83 of the first finger section 81. Further, the root side portion of the second finger section 91 is fitted into the second finger section insertion portion 821 of the first finger section 81. Further, the second finger section 91 is arranged in the multi-joint finger 80A so that the central bottom surface 92 of the second finger section 91 is directed to the palm side of the hand.

In the next place, FIG. 9 shows a side view illustrating the third finger section 101. The third finger section 101 is also formed by providing a pair of side surface portions 103 so that they are parallel to one another on the both sides of a central bottom surface portion 102 by bending one sheet of flat plate (plate member) along lower sides into a substantially U-shaped form, in the same manner as the first finger section 81 and the second finger section 91. The fifth connecting portion 107 is provided at upper portions disposed on the root side of the pair of side surface portions 103, which is rotatably connected to the second finger section 91 at the portions. The seventh connecting portion 125 is provided under or below the fifth connecting portion 107.

In the next place, the first driving section 111 and the second driving section 121 will be explained. The first driving section 111 is a rod-shaped flat plate, which is rotatably connected to the joining member 50 at the third connecting portion 113 disposed on the root side as described above. On the other hand, the first driving section 111 is rotatably connected on the forward end side at the fourth connecting portion 115 at the portion allowed to protrude toward the root side as compared with the second connecting portion 97 of the second finger section 91. Further, as shown in FIG. 1, a part of the fourth connecting portion 115 enters the inside of the opening portion 85 on the outer side (back side of the hand) of the first finger section 81 by the aid of the second finger section insertion portion 821.

The second driving section 121 is also a rod-shaped flat plate in the same manner as the first driving section 111, which is rotatably connected to the portion of the first finger section 81 allowed to protrude toward the forward end side as compared with the second connecting portion 97 at the sixth connecting portion 123 disposed on the root side. On the other hand, the portion on the root side of the third finger section 101 is rotatably connected at the seventh connecting portion 125 disposed on the forward end side of the second driving section 121.

Further, urging means 140, which is composed of a tension spring, is attached between the second finger section 91 and the third finger section 101, and the urging force is applied in the direction in which the interval between the second finger section 91 and the third finger section 101 is always opened or increased (direction in which the forward end side portion of the third finger section 101 is moved to the outer side (back side of the hand) with respect to the second finger section 91 about the center of the fifth connecting portion 107). Note that the fifth connecting portion 107 is positioned on the inner side (palm side of the hand) as compared with the supporting point a1 of the urging means 140 disposed on the side of the second finger section 91. In other words, the urging means 140 urges so that the spacing distance is decreased between the supporting point a1 fastened to the second finger section 91 and the supporting point a2 fastened to the third finger section 101. When the third finger section 101 is moved to the inner side (palm side of the hand) with respect to the second finger section 91, the interval between the both supporting points a1, a2 is increased. Therefore, the urging means 140 urges more strongly in the direction directed to the original open position. Accordingly, the urging action is applied so that the interval between the first finger section 81 and the second finger section 91 is also increased. Consequently, the first finger section 81, the second finger section 91, and the third finger section 101 are urged as a whole in the opening direction. Note that the urging means 140 may be attached between the first finger section 81 and the second finger section 91 so that the urging force is applied in the direction in which the interval between the first finger section 81 and the second finger section 91 is always opened or increased, in place of the arrangement as described above.

In this arrangement, as also understood from FIGS. 1 to 5, the hand mechanism 1 is provided with the one single-joint finger 80C together with the two multi-joint fingers 80A, 80B. The single-joint finger 80C is formed by a fourth finger section 180 as one finger section. The single-joint finger 80C is attached to the attachment member 10 so that the single-joint finger 80C is opposed to the two multi-joint fingers 80A, 80B and the single-joint finger 80C is rotatable with respect to the attachment member 10 about a center of an eighth connecting portion 200. Note that the connecting portion 200 is provided at a position separated from the root side of the fourth finger section 180 toward the forward end side by a constant distance. A connecting portion 201 is further provided on the root side of the fourth finger section 180. The connecting portion 201 is the connecting portion provided in order that the joining section 190, which is rotatably connected to the first finger section 81 by the aid of the tenth connecting portion 202 as described above, is rotatably connected to the fourth finger section 180. Owing to the link construction as described above, the single-joint finger 80C is rotated with respect to the attachment member 10 about the center of the connecting portion 200 in cooperation with the movement of the first finger sections 81 for forming the multi-joint fingers 80A, 80B, in other words, by means of a part of the driving force transmitted by the aid of the joining section 190 from the driving mechanism 30 for applying the driving force to the first finger section 81.

The hand mechanism 1, which has the construction concerning the fingers as described above, is capable of gripping the gripping object positioned in the space (gripping space 300, see FIGS. 2 and 5) between the multi-joint finger 80A and the multi-joint finger 80B and the single-joint finger 80C. That is, the hand mechanism 1 is capable of realizing a variety of gripping actions by executing the two gripping action modes (operation modes) described later on so that the gripping space is narrowed in accordance with the driving force transmitted from the driving mechanism 30.

Note that as shown in FIG. 5, a spring 181 is arranged between a position disposed in the vicinity of the connecting portion 201 on the root side of the fourth finger section 180 and a supporting point 182 disposed near to the main actuator body 33, i.e., at the inside of the attachment member 10. The spring 181 urges so that the moment is generated to rotate the fourth finger section 180 at all times in the direction of the arrow m1 shown in FIG. 5 (in the clockwise direction in the drawing) about the center of the connecting portion 200 in a range of rotation of the fourth finger section 180 about the center of the connecting portion 200. Then, when the moment is applied by the spring 181 at all times in the direction of the arrow m1 shown in FIG. 5 as described above, the moment is generated to rotate the multi-joint finger 80A and the multi-joint finger 80B in the direction of the arrow m2 shown in FIG. 5 (in the counterclockwise direction in the drawing) by the aid of the joining section 190. Therefore, the spring 181 urges the respective fingers 80A, 80B, 80C for constructing the hand mechanism 1 in the closing direction at all times. Further, the spring 181 urges the first finger sections 81 of the multi-joint fingers 80A, 80B, but the spring 181 does not urge the second finger section 91 and the third finger section 101. Therefore, the urging force of the urging means 140 is not inhibited. Therefore, the urging force exerted on the second finger section 91 and the third finger section 101 by the urging means 140 and the urging force exerted on the first finger section 81 by the spring 181 effectively work respectively without being offset.

In this arrangement, in the case of the hand mechanism 1, as shown in FIGS. 1 to 4, the finger sections of the respective fingers are constructed and the respective fingers are attached to the attachment member 10 so that the rotation plane of the multi-joint finger 80A (locus provided when the finger is rotated in accordance with the first mode and the second mode described later on, this definition being identical in relation to the rotation planes of other fingers in the following description), the rotation plane of the multi-joint finger 80B, and the rotation plane of the single-joint finger 80C are parallel to one another. Therefore, even when the first mode and the second mode are executed as described later on, then the multi-joint fingers 80A, 80B and the single-joint finger 80C do not intersect with each other, and no influence is exerted on the gripping of the gripping object. Further, as understood from FIG. 4, the relative positions of the respective fingers are determined so that the rotation plane of the single-joint finger 80C is interposed between the rotation planes of the multi-joint fingers 80A, 80B when the hand mechanism 1 is viewed from the front. Owing to the arrangement as described above, such a form is provided that the two multi-joint fingers 80A, 80B grip the gripping object on the both sides of the single-joint finger 80C in all of the first mode and the second mode. Therefore, the gripping object can be always supported stably at three points.

Further, as shown in FIG. 2, the greater part of the joining section 190 for joining the first finger section 81 of the multi-joint finger 80A, 80B and the fourth finger section 180 of the single-joint finger 80C is hidden at the inside of the attachment member 10, and only a part thereof is exposed to the gripping space 300. Owing to the construction adopted as described above, it is possible to prevent the gripping space 300 from being narrowed by the joining section 190 as compared with any construction in which the greater part of the joining section 190 is exposed to the gripping space 300. It is possible to more precisely grip the gripping object by the hand mechanism 1, or it is easy to control the determination of the position and/or the determination of the attitude of the hand mechanism 1 when it is intended to grip the gripping object. Preferably, the positions are determined for the tenth connecting portion 202 as the joining region for joining the joining section 190 to the first finger section 81 and the ninth connecting portion 201 as the joining region for joining the joining section 190 to the fourth finger section 180 so that the amount of exposure of the joining section 190 on the side of the gripping space 300 is suppressed to be small as far as possible during the periods in which the first mode and the second mode are executed as described later on. Further, the spring 181, which applies the urging force to the fourth finger section 180, is also accommodated in the attachment member 10. Therefore, the spring 181 does not interfere with the gripping action for gripping the gripping object by the hand mechanism 1.

<Action of Hand Mechanism 1>

The gripping action of the hand mechanism 1 will now be explained in detail. In relation to the hand mechanism 1, those executed are the first mode in which the pinching action for pinching the gripping object is performed by the multi-joint fingers 80A, 80B and the single-joint finger 80C and the second mode in which the enfolding action for enfolding the gripping object is performed principally by the multi-joint fingers 80A, 80B. The actions of the hand mechanism 1 in these modes will be explained as exemplified, by way of example, by a form in which the first mode and the second mode are successively executed as starting from a state in which the respective fingers of the hand mechanism 1 are maximally open (for example, a state shown in FIG. 5).

(1) First Mode

In the first mode, the pinching action for the gripping object is performed. In this section, FIG. 5 shows a state in which the rod 35 of the linear actuator 31 is most retracted or withdrawn into the main actuator body 33. In this state, the joining member 50 is in a state of being most retracted toward the linear actuator about the center of the first connecting portion 87. In this situation, the multi-joint fingers 80A, 80B are in such a state that the entire fingers are rotated most outwardly, and the respective fingers are stretched or unbent in a straight form as shown in FIG. 5, on account of the link structure based on the driving section and the finger sections included in each of the fingers. In this state, the first finger section 81 is disposed at such a position that the first finger section 81 is rotated most outwardly about the center of the first connecting portion 87. Therefore, the fourth finger section 180 of the single-joint finger 80C is also placed at a position at which the fourth finger section 180 is rotated most outwardly about the center of the eighth connecting portion 200 by the aid of the joining section 190. As a result, the multi-joint fingers 80A, 80B and the single-joint finger 80C are in the state of being most opened, and the largest gripping space 300 is formed.

Starting from this state, the linear actuator 31 is driven, and the rod 35 is extruded. In this situation, if it is assumed that the gripping object does not exist in the gripping space 300, then the joining member 50 is rotated in the counterclockwise direction as viewed in FIG. 5 about the center of the first connecting portion 87, and the third connecting portion 113 is extruded in the direction directed to the fourth connecting portion 115. Accordingly, the first finger section 81, the second finger section 91, and the third finger section 101 are progressively rotated inwardly as a whole about the center of the first connecting portion 87 integrally as they are, i.e., while maintaining such a state that the multi-joint fingers 80A, 80B are stretched in a straight form. The reason, why the first finger section 81, the second finger section 91, and the third finger section 101 are integrally rotated as a whole as they are, is that the urging force is applied by the urging means 140 to maintain the attitudes of the respective finger sections in the multi-joint fingers 80A, 80B.

Further, when the entire multi-joint fingers 80A, 80B are rotated inwardly about the center of the first connecting portions 87, the fourth finger section 180 of the single-joint finger 80C is also rotated inwardly about the center of the eighth connecting portion 200 by the aid of the joining section 190. As a result, the action, i.e., the pinching action is performed, in which the hand mechanism 1 is progressively closed so that the distance between the forward end portions of the multi-joint fingers 80A, 80B and the forward end portion of the single-joint finger 80C is narrowed in the state in which the respective fingers are stretched in relation to the multi-joint fingers 80A, 80B and the single-joint finger 80C, resulting in, for example, a state shown in FIG. 10. Note that the urging force is applied inwardly to the fourth finger section 180 by the spring 181 during the process in which the pinching action is performed. Therefore, the pinching action is performed smoothly.

FIG. 10 shows a state in which the distance between the forward end portions of the multi-joint fingers 80A, 80B and the forward end portion of the single-joint finger 80C is minimized as viewed from the side surface of the hand mechanism 1 in accordance with the pinching action in the first mode. In this embodiment, the respective fingers are constructed so that the forward end portions are opposed to one another in the state in which the distance between the both forward end portions is decreased as described above. Thus, if the position and the attitude of the hand mechanism 1 are controlled so that the gripping object is positioned between the both forward end portions, the gripping object can be gripped in a pinching state as shown in FIG. 11 by means of the respective forward end portions of the multi-joint fingers 80A, 80B and the single-joint finger 80C. Note that the urging force is also applied inwardly to the fourth finger section 180 by the spring 181 as shown in FIG. 10 in the state in which the gripping object is gripped. Therefore, in the first mode, the urging force acts to maintain the gripping state of the gripping object between the forward end portions. Thus, even when the position and/or the attitude of the entire hand mechanism 1 is/are varied in the state in which the gripping object is gripped, it is possible to continuously grip the gripping object stably. Further, even if the power source of the linear actuator 31 is shut off, and the supply of the driving force is cut off, it is possible to continuously grip the gripping object by means of the urging force of the spring 181.

Further, the hand mechanism 1 is constructed so that the positions of the respective forward end portions of the multi-joint fingers 80A, 80B and the single-joint finger 80C, which are provided when the pinching action is performed as described above, are located between the first connecting portion 87 which is the attachment position of the multi-joint finger 80A, 80B with respect to the attachment member 10 and the eight connecting portion 200 which is the attachment position of the single-joint finger 80C with respect to the attachment member 10, in the gripping direction for gripping the gripping object as shown in FIG. 12, i.e., in the direction in which the respective forward end portions approach the gripping object to allow the gripping force to act thereon. As described above, in the first mode, the entire finger of the multi-joint finger 80A, 80B is rotated about the center of the first connecting portion 87, and the single-joint finger 80C is rotated about the center of the eighth connecting portion 200. Therefore, such a state is given that the forward end portions of the respective fingers protrude most distally on the side of the gripping object during the rotation action between the first connecting portion 87 and the eighth connecting portion 200. Accordingly, when the forward end portions of the respective fingers are arranged as shown in FIG. 12, then it is thereby easy to grasp the loci provided by the forward end portions of the respective fingers during the pinching action, and it is easy to prevent the respective fingers from the interference, for example, with a floor surface FL on which the gripping object is placed. In particular, it is preferable to attach the respective fingers to the attachment member 10 so that the angle of inclination θ1 of the first connecting portion 87 based on the reference point of the forward end portion of each of the fingers in the state in which the gripping object is pinched (angle formed by the normal line at the reference point and the line for connecting the reference point and the connecting portion) is approximately equal to the angle of inclination θ2 of the eighth connecting portion 200.

Note that when the linear actuator 31 is driven to backwardly retract the rod 35 having been extruded as described above, then the entire multi-joint fingers 80A, 80B are integrally rotated about the center of the first connecting portions 87 in accordance with the action provided reversely to the above, and the fourth finger section 180 of the single-joint finger 80C is also rotated about the center of the eighth connecting portion 200. Accordingly, the multi-joint fingers 80A, 80B and the single-joint finger 80C are opened to return to the state shown in FIG. 5.

Note that in the first mode, the gripping object is not only pinched by the forward end portions of the multi-joint fingers 80A, 80B and the forward end portion of the single-joint finger 80C as shown in FIG. 11, but the gripping object may be also gripped so that the gripping object is interposed by inner intermediate portions of the multi-joint fingers 80A, 80B and an inner intermediate portion of the single-joint finger 80C as shown in FIG. 13. That is, in the first mode, the gripping action, in which the gripping object is gripped by the respective fingers, is performed in accordance with the action in which the entire multi-joint fingers 80A, 80B are rotated about the center of the first connecting portions 87, and the single-joint finger 80C is rotated about the center of the eighth connecting portion 200.

(2) Second Mode

In the next place, the second mode executed by the hand mechanism 1 will be explained on the basis of FIGS. 14 and 15. FIG. 14 shows a side view illustrating the hand mechanism 1 in the same manner as FIG. 2. FIG. 15 shows a perspective view illustrating the construction of the multi-joint fingers 80A, 80B while omitting the illustration of the construction relevant to the single-joint finger 80C so that the structures of the multi-joint fingers 80A, 80B are easily grasped from the inside. The second mode resides in the gripping action to be performed subsequently to the first mode described above. Such a state is now assumed that the first finger section 81 abuts against the gripping object during the process in which the first mode described above is executed and the first finger section 81 is rotated inwardly about the center of the first connecting portion in a state in which the gripping object (indicated by an alternate long and two short dashes line in the drawing) is arranged in the gripping space 300. Starting from this state, when the linear actuator 31 is further driven to extrude the rod 35, and the joining member 50 is thereby rotated about the center of the first connecting portion 87, then the third connecting portion 113 is extruded in the direction directed to the fourth connecting portion 115. In this case, the first driving section 111, which is connected to the joining member 50, is joined to the second finger section 91 at the fourth connecting portion 115, and the first finger section 81 is joined to the second finger section 91 at the second connecting portion 97 disposed inwardly as compared with the fourth connecting portion 115. Therefore, the driving force of the first driving section 111 joined to the driving mechanism 30 is firstly transmitted to the second finger section 91, and then the driving force is transmitted to the first finger section 81. Then, the torques, which are provided about the centers of the first connecting portion 87 and the second connecting portion 97 respectively, are generated in the first finger section 81 and the second finger section 91. In this situation, the rotation of the first finger section 81 is substantially inhibited because the gripping object exists. As a result, when the driving force transmitted from the driving mechanism 30 overcomes the urging force of the urging means 140, the second finger section 91 is progressively rotated inwardly about the center of the second connecting portion 97 as shown in FIG. 14.

In this situation, as shown in FIG. 14, the sixth connecting portion 123, which is provided for the first finger section 81 and which stands still, is in a state of being adjacent to the fourth connecting portion 115 which is rotatable about the center of the second connecting portion 97. Therefore, the second driving section 121 is retracted backwardly with respect to the second finger section 91 to give a state in which the sixth connecting portion 123 relatively escapes from the inside of the sixth connecting portion insertion recess 931. Accordingly, the seventh connecting portion 125 is retracted backwardly, and the seventh connecting portion 125 enters the inside of the seventh connecting portion insertion recess 933. The third finger section 101 is progressively rotated inwardly about the center of the fifth connecting portion 107 with respect to the second finger section 91. Then, as shown in FIG. 14, when the second finger section 91 is bent inwardly with respect to the first finger section 81, the fourth connecting portion 115 is progressively exposed to the outside from the inside of the opening portion 85 of the first finger section 81.

Accordingly, the second finger section 91 and the third finger section 101 are bent, and the gripping object is gripped in such a manner that the gripping object is progressively enfolded (rolled up) by the finger sections. In other words, the second driving section 121 is connected at the sixth connecting portion 123 disposed on the forward end side of the first finger section 81, and the second finger section 91 is connected to the first finger section 81 at the second connecting portion 97 disposed on the root side of the sixth connecting portion 123. Therefore, when the second finger section 91 is rotated with respect to the first finger section 81, the second driving section 121 pulls the third finger section 101 or regulates the movement thereof at the seventh connecting portion 125 disposed on the inner side of the fifth connecting portion 107. As a result, the second finger section 91 and the third finger section 101 are simultaneously rotated inwardly and bent to grip the gripping object so that the gripping object is rolled up or enfolded. In other words, when the second finger section 91 is rotated with respect to the first finger section 81, the third finger section 101 is necessarily rotated simultaneously with respect to the second finger section 91.

Note that the first finger section 81 is not rotated during the execution of the second mode. Therefore, the fourth finger section 180 of the single-joint finger 80C, which is joined at the joining section 190, is not rotated as well. Therefore, in the second mode, the gripping action for the gripping object, which is based on the enfolding action, is performed principally by the multi-joint fingers 80A, 80B. However, when the gripping object is relatively small, as shown in FIG. 16, the rotation action is inhibited in some cases in a state in which the gripping object is interposed between the first finger section 81 and the fourth finger section 180. In such a situation, the direct enfolding for the gripping object, which would be otherwise caused by the second finger section 91 and the third finger section 101, is not caused. The gripping object is gripped by the first finger sections 81 of the multi-joint fingers 80A, 80B and the fourth finger section 180 of the single-joint finger 80C.

In this case, when the rod 35 is driven by the linear actuator 31 so that the rod 35 is retracted in the second mode, the joining member 50 is rotated toward the attachment member 10 about the center of the first connecting portion 87. The second finger section 91 and the third finger section 101 are rotated about the centers of the second connecting portion 97 and the fifth connecting portion 107 in accordance with the action reverse to the above. The gripping object is released from the enfolding state having been effected by these fingers. Then, when the second finger section 91 and the third finger section 101 return to the state having been provided upon the abutment of the first finger section 81 against the gripping object, during the change from the first mode to the second mode, then the operation mode of the hand mechanism 1 is switched thereafter, and the first mode described above is executed. On this account, the entire fingers of the multi-joint fingers 80A, 80B perform the rotation about the center of the first connecting portions 87, and the single-joint finger 80C performs the rotation about the center of the eighth connecting portion 200.

In the case of the hand mechanism 1 as described above, the gripping action based on the first mode is performed, unless the gripping object is brought in contact with the first finger section 81 to inhibit the rotation thereof. When the rotation of the first finger section 81 is inhibited by the gripping object, the gripping action based on the first mode is switched into the gripping action based on the second mode. Therefore, the gripping object, which is positioned in the gripping space 300, can be reliably gripped in accordance with at least the gripping action based on the first mode or the gripping action based on the second mode. Further, as described above, the hand mechanism 1 is formed so that the respective rotation planes of the multi-joint fingers 80A, 80B and the single-joint finger 80C do not intersect with each other. Therefore, even when the respective fingers are rotated in any way in the mode ranging over the first mode and the second mode, the fingers do not interfere with each other. Thus, the gripping object can be precisely gripped provided that the gripping object exists in the gripping space 300. Further, as described above, the urging force of the spring 181 is applied in the mode ranging over the first mode and the second mode to assist the driving force in the direction in which the fingers of the hand mechanism 1 are closed. The urging force is applied to the side of the single-joint finger 80C having the simple structure, and thus it is possible to realize the effective output assist for the linear actuator 31 and it is possible to facilitate the miniaturization of the hand mechanism 1 without unnecessarily complicating the structure of the hand mechanism 1 and without deteriorating the controllability of the hand mechanism 1.

By the way, in relation to the hand mechanism 1, when the position, at which the gripping object abuts against the first finger section 81 of one multi-joint finger 80A, is different from the position at which the gripping object abuts against the first finger section 81 of the other finger 80B, the multi-joint finger 80A and the multi-joint finger 80B perform independent actions which are different from each other in the second mode, while the positions of the third connecting portions 113 of the both are maintained at the identical positions. That is, the bending states of the first finger sections 81, the second finger sections 91, and the third finger sections 101 of the respective multi-joint fingers 80A, 80B can be easily made different from each other, depending on the shape of the gripping object intended to be gripped, by merely simultaneously driving the two sets of the multi-joint fingers 80A, 80B arranged in parallel by using the single driving mechanism 30. Thus, it is possible to grip the gripping object stably.

Further, in the case of the hand mechanism 1 described above, as for each of the first finger section 81, the second finger section 91, and the third finger section 101, the plate member is bent into the U-shaped form, and the central bottom surface portion 82, 92, 102 is arranged while being directed inwardly. Therefore, the bottom surface portions 82, 92, 102 can be allowed to directly function as the abutment surfaces with respect to the gripping object. Therefore, it is unnecessary to specially attach any part to serve as the abutment surface. It is possible to simplify the structure and realize a light weight.

Further, in the case of the hand mechanism 1, the fourth connecting portion 115 is provided at the portion of the second finger section 91 allowed to protrude toward the root side as compared with the second connecting portion 97. Therefore, the second connecting portion 97 and the fourth connecting portion 115 are not overlapped with each other in the height direction. Accordingly, it is possible to realize a thin height dimension of the portion in the vicinity of the second connecting portion 97 connected with the first finger section 81 and the second finger section 91. Similarly, a part of the fourth connecting portion 115 enters the inside of the opening portion 85 which is open on the outer side of the first finger section 81, and thus the inside of the first finger section 81 is used as a part of the space for the swinging movement of the fourth connecting portion 115. As a result, it is possible to decrease the protruding amount (protruding dimension) by which the fourth connecting portion 115 protrudes to the outside from the inside of the opening portion 85 of the first finger section 81 when the second finger section 91 is bent inwardly with respect to the first finger section 81. Accordingly, it is possible to realize a thin height dimension of the portion in the vicinity of the second connecting portion 97 connected with the first finger section 81 and the second finger section 91, irrelevant to the bending state between the first finger section 81 and the second finger section 91.

On the other hand, the sixth connecting portion 123 is provided at the portion allowed to protrude toward the forward end side as compared with the second connecting portion 97. Therefore, the second connecting portion 97 and the sixth connecting portion 123 are not overlapped with each other in the height direction. The sixth connecting portion 123 is provided for the first finger section 81 in order to join the second driving section 121 for driving the third finger section 101. This also makes it possible to realize a thin height dimension of the portion in the vicinity of the second connecting portion 97 connected with the first finger section 81 and the second finger section 91. Further, the sixth connecting portion insertion recess 931, which is provided for the second finger section 91, is arranged between the both left and right side surface portions 83 of the first finger section 81. Therefore, it is possible to decrease the protruding amount (protruding dimension) by which the sixth connecting portion 123 protrudes to the outside from the second finger section 91. In other words, this construction also makes it possible to realize a thin height dimension of the portion in the vicinity of the second connecting portion 97 connected with the first finger section 81 and the second finger section 91, irrelevant to the bending state between the first finger section 81 and the second finger section 91.

Note that each of the first driving section 111 and the second driving section 121 is the rod-shaped flat plate. Therefore, even when the construction, in which the fitting is effected between the both side surfaces 93 of the second finger section 93, is adopted, then it is possible to decrease the width between the both side surfaces 93, and it is possible to provide the necessity minimum widthwise dimension for the second finger section 91.

First Modified Embodiment

In the case of the hand mechanism 1 of the embodiment described above, the part of the fourth connecting portion 115 enters the inside of the opening portion 85 of the first finger section 81. However, it is also allowable that the entire fourth connecting portion 115 may enter the inside of the opening portion 85 of the first finger section 81. Further, the driving force of the linear actuator 31 may be transmitted to the third connecting portion 113 by means of any member (for example, a linear guide) other than the joining member 50.

Second Modified Embodiment

Further, in the case of the hand mechanism 1 of the embodiment described above, the link mechanism of the multi-joint finger 80A is the same as that of the multi-joint finger 80B. However, it is also allowable that the link mechanism is constructed differently between the both multi-joint fingers. That is, it is also allowable that the position of any one of the first connecting portion 87, the second connecting portion 97, the third connecting portion 113, and the fourth connecting portion 115 is different between the both multi-joint fingers 80A, 80B.

Third Modified Embodiment

Further, in relation to the hand mechanism 1 of the embodiment described above, the following construction is also available. That is, grooves are provided in regions of the forward end portions of the multi-joint finger 80A and the multi-joint finger 80B at which the gripping object is brought in contact especially when the gripping object is gripped in accordance with the pinching action in the first mode, and a deformable portion, which is deformable in accordance with the contact with the gripping object, is provided in a region of the forward end portion of the single-joint finger 80C at which the gripping object is brought in contact especially when the gripping object is gripped in accordance with the pinching action in the first mode. The formation of the groove is effective in order to grip the gripping object in accordance with the pinching action without any slippage. However, if the grooves are formed at both of the forward end portions of the multi-joint finger 80B and the multi-joint finger 80B and the forward end portion of the single-joint finger 80C, there is such a possibility that the gripping object may be pinched and moved upwardly in an extremely unstable state, if a part of the gripping object is caught in the groove. In view of the above, in order to avoid the unstable pinching action as described above, the gripping action in the first mode can be made reliable by forming the deformable portion which is deformable in imitation of the shape of the gripping object at the forward end portion of one of the fingers. Therefore, no problem arises even when the groove is formed at the forward end portion of the single-joint finger 80C and the deformable portions are formed at the forward end portions of the multi-joint finger 80A and the multi-joint finger 80B.

Second Embodiment

A hand mechanism 1 according to a second embodiment will be explained on the basis of FIGS. 1, 17, and 18. As shown in FIG. 1, the hand mechanism 1 according to this embodiment has suction mechanisms 400 which are provided at first finger sections 81 of the multi-joint fingers 80A, 80B. The suction mechanism 400 includes a suction nozzle 402 which has a suction surface 403 for sucking and retaining a suction object in accordance with the suction of air, the suction nozzle 402 being attached to the first finger section 81 by the aid of a support member 401. Note that a hose, through which the air sucked from the suction nozzle 402 is fed to the pump side, is omitted from the illustration in the drawings of this embodiment. As described in the foregoing first embodiment, the first finger section 81 is formed to have the U-shaped cross section. The driving force is transmitted to the second finger section 91 in the state in which the first driving section 111 is fitted in the interior space thereof. Therefore, the space, which is disposed at the upper portion of the opening portion 85 of the first finger section 81, is the space required for the link action of the first driving section 111. In view of the above, in order that the link action of the first driving section 111 is not inhibited by the suction mechanism 400, as shown in FIG. 1, the support member 401 is constructed such that a pair of side walls 401a, which extend in the longitudinal direction of the first finger section 81 (i.e., the longitudinal direction of the first driving section 111), are connected to one another by a connecting wall 401b on the forward end side. Then, the suction nozzle 402 is supported by the connecting wall 401b. When the suction nozzle 402 is retained as described above, the suction mechanism 400 can be thereby fixed on the back side of the hand of the first finger section 81, without occupying the upward space of the first finger section 81.

The suction mechanism 400 is capable of retaining the suction object in a state of being brought in contact with the suction surface 403 by sucking the air from the suction nozzle 402. Therefore, the hand mechanism 1 shown in FIG. 1 is also capable of retaining the suction object by means of the suction mechanism 400, in addition to the gripping action for the gripping object in accordance with the first mode and the second mode described above. As described above, the hand mechanism 1 can grip or retain the object in a variety of modes. Therefore, for example, a processing object can be gripped, for example, in a state suitable for a production line in a production site such as a factory or the like. Further, the range of the object as the object of the gripping or the like can be set as wide as possible.

Note that the suction mechanism 400 is fixed to the first finger section 81. However, the first finger section 81 is the finger section which is rotated about the center of the first connecting portion 87 when the entire multi-joint finger 80A, 80B is rotated in the first mode, and the first finger section 81 is the finger section which is inhibited from being rotated in the second mode. Therefore, the movement thereof is simple as compared with the second finger section 91 and the third finger section 101 in the hand mechanism 1 for performing the gripping action described above. Therefore, when the suction mechanism 400 is attached to the first finger section 81, the attitude of the suction mechanism 400 can be thereby controlled in the state in which any influence is hardly exerted by the gripping action performed by the hand mechanism 1, i.e., the movement of the finger section of the multi-joint finger 80A, 80B. The convenience of the hand mechanism 1 is improved. In an alternative method, the suction mechanism 400 may be attached to any finger section other than the first finger section 81 of the multi-joint finger 80A, 80B. Further alternatively, the suction mechanism 400 may be attached to the fourth finger section 180 of the single-joint finger 80C.

Further, in order to suck the suction object by means of the suction mechanism 400, it is necessary to perform the suction of the air in a state in which the suction object is brought in contact with the suction surface 403. However, it is necessary that the attitudes of the respective fingers of the hand mechanism 1 should be in the state suitable for the suction of the suction object in order to bring the suction surface 403 in contact with the suction object, depending on the relative position of the suction mechanism 400 with respect to the multi-joint finger 80A, 80B, especially depending on the relative position of the suction surface 403. Accordingly, the suction state of the suction object, which is brought about by the suction mechanism 400, is exemplified below.

First Example

The entire finger of the multi-joint finger 80A, 80B is rotated about the center of the first connecting portion 87 in the state in which the first mode is executed by the hand mechanism 1 (including the state shown in FIG. 5 in which the widest gripping space 300 is formed). When the suction mechanism 400 is attached so that the suction surface 403 does not protrude toward the suction object from the forward end portion of the multi-joint finger 80B, 80B in this state, such a situation sometimes arises that the multi-joint finger 80A, 80B interferes with the suction object in the first mode and it is impossible to provide such a state that the suction surface 403 is brought in contact with the suction object in order to perform the suction. Further, even when the suction surface 403 protrudes toward the suction object from the forward end portion of the multi-joint finger 80A, 80B, the multi-joint fingers 80A, 80B and the single-joint finger 80C are opened or separated from each other relatively widely in the first mode. Therefore, the single-joint finger 80C interferes with the suction object and/or any structure disposed therearound, and it is impossible in some cases to provide such a state that the suction surface 403 is brought in contact with the suction object in order to perform the suction.

In the situation as described above, the first finger section 81 is firstly rotated in accordance with the first mode until the limit of possible rotation of the first finger section 81 in view of the structure. As a result, the first finger section 81 is in a state in which the first finger section 81 cannot be rotated, in the same manner as the state in which the rotation of the first finger section 81 is inhibited by the gripping object. Therefore, the rotation action based on the second mode is started. Then, as shown in FIG. 17, the multi-joint fingers 80A, 80B and the single-joint finger 80C are in a folded state in accordance with the gripping action based on the second mode, although the gripping object is not gripped by the hand mechanism 1. In this state, the suction surface 403 greatly protrudes toward the suction object from the multi-joint finger 80A, 80B. In the case of such a state, the suction surface 403 can be brought in contact with the suction object with ease. Therefore, it is possible to suck and retain the suction object by means of the suction mechanism 400.

Note that if the suction retaining force, which is provided by the suction mechanism or mechanisms 400 (two suction mechanisms 400 in the case of this embodiment) carried on one hand mechanism 1, is not sufficient to suck and retain the suction object, it is appropriate that a plurality of hand mechanisms 1 are utilized to perform the suction and retention by means of the suction mechanisms 400 carried thereon as shown in FIG. 17.

Second Example

When the suction mechanism 400 is attached so that the suction surface 403 protrudes toward the suction object from the forward end portion of the multi-joint finger 80A, 80B in the state in which the first mode is executed (FIG. 18 shows a state in which the suction surface 403 protrudes by δ), the suction surface 403 can be basically brought in contact the suction object irrelevant to the attitude of the multi-joint finger 80A, 80B. However, the single-joint finger 80C interferes with the suction object and/or any structure disposed therearound in some cases when the single-joint finger 80C is still in the open state as described above. Therefore, it is appropriate to perform the suction in the following state. That is, both of the multi-joint fingers 80A, 80B and the single-joint finger 80C are folded as in the first example described above. Alternatively, as shown in FIG. 18, the multi-joint fingers 80A, 80B and the single-joint finger 80C are closed, and the distance between the forward end portions of the both fingers are decreased as small as possible, as in the situation in which the pinching action is performed in accordance with the first mode. Accordingly, it is possible to perform the suction and retention by means of the suction mechanism 400 without being disturbed by the single-joint finger 80C.

EXPLANATION OF REFERENCE NUMERALS AND CHARACTERS

1: hand, 10: attachment member, 30: driving mechanism, 31: linear actuator, 50: joining member, 80A, 80B: multi-joint finger, 80C: single-joint finger, 81: first finger section, 82: bottom surface portion, 83: side surface portion, 87: first connecting portion, 91: second finger section, 92: bottom surface portion, 93: side surface portion, 93a: side on the back side of the hand, 931: sixth connecting portion insertion recess, 97: second connecting portion, 101: third finger section, 107: fifth connecting portion, 111: first driving section, 113: third connecting portion, 115: fourth connecting portion, 121: second driving section, 123: sixth connecting portion, 125: seventh connecting portion, 180: fourth finger section, 190: joining section, 200: eight connecting portion, 201: ninth connecting portion, 202: tenth connecting portion, 300: gripping space, 400: suction mechanism, 401: support member, 402: suction nozzle, 403: suction surface.

The invention claimed is:

1. A hand mechanism comprising:
an attachment member;
a first multi-joint finger and a second multi-joint finger each of which is a multi-joint finger including a plurality of finger sections connected so that the finger sections are mutually rotatable by the aid of connecting portions, one finger section of the plurality of finger sections being rotatably attached to the attachment member on a root side thereof;
a driving section which transmits a driving force from a single driving actuator to the first multi-joint finger and the second multi-joint finger; and
a single-joint finger formed by one finger section which is connected to the first multi-joint finger and the second multi-joint finger and which is connected to be rotatable about a center of a predetermined connecting portion with respect to the attachment member, the single-joint finger being rotatable about the center of the predetermined connecting portion together with the first multi-joint finger and the second multi-joint finger by the driving force transmitted from the single driving actuator; wherein the hand mechanism is capable of executing:
a first mode in which the respective entire fingers of the first multi-joint finger and the second multi-joint finger are rotated in an identical direction by the aid of the connecting portions for making connection with the attachment member when the driving force is applied via the driving section from the single driving actuator; and
a second mode in which the finger section other than a first predetermined finger section included in the first multi-joint finger is rotated with respect to the first predetermined finger section and the finger section other than a second predetermined finger section included in the second multi-joint finger is rotated with respect to the second predetermined finger section, when the first predetermined finger section included in the first multi-joint finger and the second predetermined finger section included in the second multi-joint finger are inhibited from being rotated in the first mode;
the single-joint finger is rotated in the first mode in a direction opposite to a rotation direction of the first multi-joint finger and the second multi-joint finger, both of a distance between a forward end portion of the first multi-joint finger and a forward end portion of the single-joint finger and a distance between a forward end portion of the second multi-joint finger and the forward end portion of the single-joint finger being narrowed in the direction; and
the rotation of the single-joint finger about the center of the predetermined connecting portion is stopped in the second mode simultaneously with stop of the rotation of the first predetermined finger section and the second predetermined finger section.

2. The hand mechanism according to claim 1, wherein the respective fingers are attached to the attachment member so that respective rotation planes of the first multi-joint finger and the second multi-joint finger and a rotation plane of the single-joint finger do not intersect with each other, and the rotation plane of the single-joint finger is positioned between the rotation plane of the first multi-joint finger and the rotation plane of the second multi-joint finger in both of the first mode and the second mode.

3. The hand mechanism according to claim 2, wherein:
the rotation plane of the first multi-joint finger, the rotation plane of the second multi-joint finger, and the rotation plane of the single-joint finger are parallel to one another; and
the forward end portions of the first multi-joint finger and the second multi-joint finger and the forward end portion of the single-joint finger are positioned so that the forward end portions are opposed to one another while interposing a gripping object therebetween in a predetermined attitude of the hand mechanism in which the gripping object is gripped by respective fingertips of the first multi-joint finger and the second multi-joint finger and a fingertip of the single-joint finger when the first mode is executed.

4. The hand mechanism according to claim 3, wherein the forward end portions of the first multi-joint finger and the second multi-joint finger and the forward end portion of the single-joint finger are positioned between attachment positions of the first multi-joint finger and the second multi-joint finger attached to the attachment member and an attachment position of the single-joint finger attached to the attachment member in a gripping direction with respect to the gripping object when the hand mechanism takes the predetermined attitude.

5. The hand mechanism according to claim 1, wherein:
the first multi-joint finger and the second multi-joint finger perform an identical rotation action with respect to the single-joint finger in the first mode; and
the rotation of the finger section other than the first predetermined finger section included in the first multi-joint finger with respect to the first predetermined finger section and the rotation of the finger section other than the second predetermined finger section included in the second multi-joint finger with respect to the second predetermined finger section are performed mutually independently in the second mode.

6. The hand mechanism according to claim 1, wherein:
the first predetermined finger section is the finger section which is attached to the attachment member in relation to the first multi-joint finger;
the second predetermined finger section is the finger section which is attached to the attachment member in relation to the second multi-joint finger; and
the first predetermined finger section and the second predetermined finger section are in link connection with the single-joint finger by the aid of a joining member.

7. The hand mechanism according to claim 6, wherein the first predetermined finger section and the second predetermined finger section are joined to the single-joint finger, while at least a part of the joining member does not pass through a gripping space in which a gripping object is positioned between the first multi-joint finger and the second multi-joint finger and the single-joint finger.

8. The hand mechanism according to claim 1, wherein each of the first multi-joint finger and the second multi-joint finger has, as the plurality of finger sections:
a first finger section which is rotatably connected to the attachment member at a first connecting portion disposed on the root side;
a second finger section having a portion disposed on the root side which is rotatably connected at a second connecting portion disposed on a forward end side of the first finger section; and a third finger section having a portion disposed on the root side which is rotatably connected at a fifth connecting portion disposed on the forward end side of the second finger section; the driving section has, corresponding to each of the first multi-joint finger and the second multi-joint finger:

a first driving section having a portion disposed on the forward end side which is rotatably connected at a fourth connecting portion disposed on the root side of the second finger section and a portion disposed on the root side which is connected to a third connecting portion for applying a driving motive power; and a second driving section having a portion disposed on the forward end side which is rotatably connected to a seventh connecting portion disposed on the root side of the third finger section and a portion disposed on the root side which is rotatably connected to a sixth connecting portion disposed on the forward end side of the first finger section;

the first mode, in which the first finger section and the second finger section are simultaneously driven to integrally rotate the both about a center of the first connecting portion, is executed by extruding the third connecting portion in a direction directed to the fourth connecting portion by means of the single driving actuator; and the second mode, in which the second finger section is rotated with respect to the first finger section about a center of the second connecting portion and the third finger section is rotated with respect to the second finger section by means of the second driving section, is executed if the rotation of the first finger section is inhibited when the driving force is applied by the single driving actuator.

9. The hand mechanism according to claim 8, wherein:

each of the first finger section, the second finger section, and the third finger section is arranged such that a plate member is bent into a U-shaped form, and a central bottom surface portion thereof is directed inwardly;

the fourth connecting portion is provided at a portion of the second finger section allowed to protrude toward the root side as compared with the second connecting portion, at least a part of the fourth connecting portion entering inside of an outer opening portion of the first finger section, and the fourth connecting portion being exposed toward outside from the inside of the opening portion of the first finger section when the second finger section is bent inwardly with respect to the first finger section; and the sixth connecting portion is provided at a portion of the first finger section allowed to protrude toward the forward end side as compared with the second connecting portion, the sixth connecting portion being inserted into a sixth connecting portion insertion recess provided at sides disposed on a back side of the hand mechanism of both left and right side surface portions of the second finger section, and the sixth connecting portion escaping from inside of the sixth connecting portion insertion recess when the third finger section is bent inwardly with respect to the second finger section.

10. The hand mechanism according to claim 1, further comprising a suction mechanism for sucking a suction object, the suction mechanism being provided at least on a back side of the hand mechanism of the first predetermined finger section of the first multi-joint finger positioned on a side opposite to the single-joint finger.

11. The hand mechanism according to claim 10, wherein a suction surface, which is positioned at a forward end portion of the suction mechanism, is arranged so that the suction surface protrudes toward the suction object from the first multi-joint finger during a period in which the first mode is executed.

12. The hand mechanism according to claim 10, wherein a suction surface, which is positioned at a forward end portion of the suction mechanism, is arranged so that the suction surface does not protrude toward the suction object from the first multi-joint finger during a period in which the first mode is executed, and the suction surface protrudes toward the suction object from the first multi-joint finger after the finger section other than the first predetermined finger section included in the first multi-joint finger is rotated by a predetermined amount with respect to the first predetermined finger section provided with the suction mechanism during a period in which the second mode is executed.

13. The hand mechanism according to claim 1, further comprising urging means which applies an urging force to the single-joint finger distinctly from the driving force applied from the single driving actuator, the urging force being applied to rotate the single-joint finger toward the first multi-joint finger and the second multi-joint finger about a center of the predetermined connecting portion.

14. The hand mechanism according to claim 13, wherein:

the finger section which is rotatably attached to the attachment member in relation to the first multi-joint finger and the finger section which is rotatably attached to the attachment member in relation to the second multi-joint finger are in link connection with the single-joint finger by the aid of a joining member at a predetermined region positioned on an inner side of the attachment member as compared with the predetermined connecting portion in relation to the finger section for forming the single-joint finger; and the urging means is provided between the attachment member and a portion disposed in the vicinity of the predetermined region in relation to the finger section for forming the single-joint finger at inside of the attachment member.

15. The hand mechanism according to claim 14, wherein the finger section which is rotatably attached to the attachment member in relation to the first multi-joint finger and the finger section which is rotatably attached to the attachment member in relation to the second multi-joint finger are joined to the single-joint finger, while at least a part of the joining member does not pass through a gripping space in which a gripping object is positioned between the first multi-joint finger and the second multi-joint finger and the single-joint finger.

16. The hand mechanism according to claim 13, wherein the urging force, which is applied by the urging means, is an urging force for rotating the single-joint finger at all times toward the first multi-joint finger and the second multi-joint finger about the center of the predetermined connecting portion during periods in which the first mode and the second mode are executed.

* * * * *